(12) United States Patent
Moon

(10) Patent No.: US 11,496,681 B2
(45) Date of Patent: Nov. 8, 2022

(54) CAMERA MODULE INCLUDING LIQUID LENS AND METHOD FOR CONTROLLING THE SAME

(71) Applicant: LG INNOTEK CO., LTD., Seoul (KR)

(72) Inventor: Young Seop Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 336 days.

(21) Appl. No.: 16/496,768

(22) PCT Filed: Mar. 23, 2018

(86) PCT No.: PCT/KR2018/003468
§ 371 (c)(1),
(2) Date: Sep. 23, 2019

(87) PCT Pub. No.: WO2018/174655
PCT Pub. Date: Sep. 27, 2018

(65) Prior Publication Data
US 2021/0109257 A1 Apr. 15, 2021

(30) Foreign Application Priority Data
Mar. 23, 2017 (KR) .................. 10-2017-0036872

(51) Int. Cl.
*H04N 5/232* (2006.01)
*G02B 3/14* (2006.01)
(Continued)

(52) U.S. Cl.
CPC .......... *H04N 5/23241* (2013.01); *G02B 3/14* (2013.01); *G02B 27/646* (2013.01); *H04N 5/2254* (2013.01)

(58) Field of Classification Search
None
See application file for complete search history.

(56) References Cited

U.S. PATENT DOCUMENTS 8,649,102 B2  2/2014  Berge et al.
9,182,521 B2  11/2015  Pugh et al.
(Continued)

FOREIGN PATENT DOCUMENTS

CN  101866026 A  10/2010
CN  102750027 A  10/2012
(Continued)

OTHER PUBLICATIONS

Supplementary European Search Report dated Nov. 17, 2020 in European Application No. 18770719.5.
(Continued)

*Primary Examiner* — Quan Pham
(74) *Attorney, Agent, or Firm* — Saliwanchik, Lloyd & Eisenschenk

(57) ABSTRACT

A camera module of an embodiment includes: a liquid lens including a common electrode and a plurality of individual electrodes; and a control circuit electrically connected to the common electrode and the individual electrodes and configured to control the liquid lens, wherein, when a driving voltage for driving the liquid lens is changed, the control circuit floats at least one of the plurality individual electrode in a state in which a first voltage is applied to the common electrode.

18 Claims, 16 Drawing Sheets

(51) Int. Cl.
*G02B 27/64* (2006.01)
*H04N 5/225* (2006.01)

(56) References Cited

U.S. PATENT DOCUMENTS

| | | | |
|---|---|---|---|
| 2006/0056041 A1* | 3/2006 | Kato | G02B 3/14 |
| | | | 359/665 |
| 2007/0201850 A1 | 8/2007 | Hendriks et al. | |
| 2007/0279539 A1* | 12/2007 | Suzuki | G02F 1/29 |
| | | | 349/1 |
| 2008/0267603 A1 | 10/2008 | Jung et al. | |
| 2011/0211262 A1 | 9/2011 | Craen et al. | |
| 2014/0197304 A1* | 7/2014 | Feng | G02B 27/646 |
| | | | 359/665 |
| 2015/0277187 A1 | 10/2015 | Akasaka | |

FOREIGN PATENT DOCUMENTS

| | | |
|---|---|---|
| CN | 103139454 A | 6/2013 |
| EP | 1 870 740 A1 | 12/2007 |
| EP | 1 906 213 A1 | 4/2008 |
| JP | 2006309011 A * | 11/2006 |
| JP | 2008-107826 A | 5/2008 |
| JP | 2008-519300 A | 6/2008 |
| JP | 2008-170632 A | 7/2008 |
| JP | 2009216946 A * | 9/2009 |
| JP | 2010-175596 A | 8/2010 |
| JP | 2011-242542 A | 12/2011 |
| JP | 2014-202804 A | 10/2014 |
| KR | 10-0462520 B1 | 12/2004 |
| KR | 10-0797677 B1 | 1/2008 |
| KR | 10-0815328 B1 | 3/2008 |
| KR | 10-2009-0018965 A | 2/2009 |
| KR | 10-1422787 B1 | 7/2014 |
| KR | 10-2016-0096268 A | 8/2016 |
| WO | WO-2015/005591 A1 | 1/2015 |

OTHER PUBLICATIONS

International Search Report in International Application No. PCT/KR2018/003468, filed Mar. 23, 2018.
Office Action dated Jul. 16, 2018 in Korean Application No. 10-2017-0036872.
Office Action dated Septembers, 2020 in Chinese Application No. 201880020329.0.
Office Action dated Jan. 11, 2022 in Japanese Application No. 2019-552156.

* cited by examiner

CAMERA MODULE INCLUDING LIQUID LENS AND METHOD FOR CONTROLLING THE SAME

CROSS-REFERENCE TO RELATED APPLICATION

This application is the U.S. national stage application of International Patent Application No. PCT/KR2018/003468, filed Mar. 23, 2018, which claims the benefit under 35 U.S.C. § 119 of Korean Application No. 10-2017-0036872, filed Mar. 23, 2017; all of which are hereby incorporated by reference in their entirety.

TECHNICAL FIELD

Embodiments relate to a camera module including a liquid lens and a method for controlling the same. More particularly, embodiments relate to a camera module and an optical device which include a control module or a control device for controlling a liquid lens capable of adjusting a focal length using electrical energy.

BACKGROUND ART

Users of portable devices desire to own optical devices having high resolution, small size, and various capture functions. The various capture functions include, for example, an auto-focus (AF) function and an optical image stabilization (OIS) function for compensating for tremor of user's hands or counteracting shaking of an optical device. Such capture functions may be implemented through a method of combining multiple lenses to directly move the lenses. However, if the number of lenses increases, the size of the optical device may increase. To perform the AF and OIS functions, a module of multiple lenses which are fixed in a lens holder and have arranged optical axes moves or tilts in the direction of the optical axes or in a vertical direction of the optical axes and an additional lens driving device is used to drive the lens module. However, the lens driving device has high power consumption and is thick in thickness because a cover glass for protecting the lens module should be provided separately from a camera module. Accordingly, studies on a liquid lens for performing the AF and OIS functions by electrically adjusting the curvature of an interface of two types of liquid have been conducted.

DISCLOSURE

Technical Problem

According to embodiments, in a camera module including a lens capable of adjusting a focal length using electrical energy, a high driving voltage is generated to drive the lens even by a low voltage, using a switching circuit and a negative voltage, thereby reducing the size of an integrated circuit for controlling the lens.

Further, according to embodiments, a positive voltage and a negative voltage are alternately supplied to a common electrode even when a low voltage is supplied to a plurality of terminals of a lens capable of adjusting a focal length, thereby generating a high voltage for driving the lens.

Still further, according to embodiments, distortion of an interface which may occur when the difference in voltage between electrodes increases is inhibited by floating partial electrodes to control a driving voltage of a lens capable of adjusting a focal length, thereby more stably performing optical image stabilization, i.e., an OIS function.

Still further, according to embodiments, a pulse of a voltage provided to a common terminal and a plurality of terminals is controlled in detail using floating to control a driving voltage of a lens capable of adjusting a focal length, thereby raising resolution and a range of lens control.

Still further, embodiments are applied to a portable device and a circuit for controlling a lens adjusting a focal length in correspondence to a driving voltage applied between a common terminal and a plurality of terminals uses a ground voltage as a power voltage, thereby reducing power consumption of the circuit and a camera module.

The technical objects that can be achieved through the present invention are not limited to what has been particularly described hereinabove and other technical objects not described herein will be more clearly understood by persons skilled in the art from the following detailed description.

Technical Solution

In one embodiment, a camera module may include a liquid lens including a plurality of electrodes; and a control circuit connected electrically to the plural electrodes and configured to control the liquid lens, wherein the plural electrodes includes a common electrode, which is disposed on the liquid lens and includes one subelectrode, and an individual electrode, which is disposed under the liquid lens and includes a plurality of subelectrodes, and wherein the control circuit includes a first voltage generator for generating a first voltage; and a second voltage generator for generating a second voltage having a polarity opposite to the first voltage. At least one of the individual electrodes may be floated while the first voltage, the second voltage, or a ground voltage is applied to the common electrode.

The second voltage generator may include a charge pump for receiving the first voltage from the first voltage generator and changing a polarity of the first voltage to output the first voltage having the changed polarity.

The first voltage may have a positive polarity and the second voltage generator may output the second voltage of a negative polarity having the same magnitude as the first voltage independently of the first voltage generator.

Switching elements included in at least one first switch may be commonly disposed in the plural subelectrodes of the individual electrode and switching elements included in plural third switches may be independently disposed in each subelectrode of the individual electrode.

Subelectrodes of at least two individual electrodes disposed at a symmetrical location based on the center of the liquid lens among plural electrode sectors may be floated during a preset time.

All of the subelectrodes of the individual electrode may be floated during a preset time.

In another embodiment, a camera module may include a liquid lens including a plurality of electrodes; and a control circuit connected electrically to the plural electrodes and configured to control the liquid lens. The liquid lens may include a first plate including a cavity in which a conductive liquid and a nonconductive liquid are disposed; a first electrode disposed on the first plate; and a second electrode which is disposed under the first plate and includes subelectrodes. The control circuit may include a first voltage generator for outputting a first voltage; a second voltage generator for outputting a second voltage having a polarity opposite to the first voltage; a first switch for transmitting the first voltage or a ground voltage; a second switch for transmitting the second voltage or the ground voltage; and third switches connected to the first switch and the second switch and connected to the subelectrodes. Each of the number of the third switches and the number of the subelectrodes may be at least 4. The four third switches may be respectively connected to the four subelectrodes and, when there is a difference between voltages applied to at least two of the four subelectrodes, the other two subelectrodes may be floated.

In another embodiment, a circuit for controlling a liquid lens including a plurality of subelectrodes may include a first voltage generator configured to output a first voltage; a second voltage generator configured to output a second voltage having a polarity opposite to the first voltage; a first switch for transmitting the first voltage or a ground voltage; a second switch for transmitting the second voltage or the ground voltage; and third switches connected to the first switch and the second switch and connected to the plural subelectrodes, wherein the third switches may float at least one of the plural subelectrodes during a preset time.

In still another embodiment, a method of controlling a liquid lens having a plurality of subelectrodes including a first subelectrode may include applying a first voltage, a second voltage having a polarity opposite to the first voltage, or a ground voltage to the first subelectrode; floating the first subelectrode during a preset time; and applying the first voltage, the second voltage, or the ground voltage after floating the first subelectrode during a preset time.

In still another embodiment, a camera module may include a liquid lens including a plurality of electrodes; and a control circuit connected electrically to the plural electrodes and configured to control the liquid lens. The liquid lens may include a first plate including a cavity in which a conductive liquid and a nonconductive liquid are disposed; a first electrode disposed on the first plate; and a second electrode which is disposed under the first plate and includes a subelectrode. The control circuit may include a first voltage generator for outputting a first voltage; a second voltage generator for outputting a second voltage having a polarity opposite to the first voltage; a first switch for transmitting the first voltage or a ground voltage; a second switch for transmitting the second voltage or the ground voltage; and a third switch connected to the first switch, the second switch, and the subelectrode. Each of the third switch and the subelectrode may be plural and the plural third switches may be respectively connected to the subelectrodes. The control circuit may cut off at least one of the third switches during a preset time to inhibit the first voltage, the second voltage, or the ground voltage from being transmitted to at least one of the subelectrodes.

The third switch may include a first switch element connected to the first switch and a second switch element connected to the second switch and cut off the first switch element and the second switch element during a preset time to inhibit the first voltage, the second voltage, or the ground voltage from being transmitted to the at least one subelectrode.

The above technical solutions are merely some parts of the embodiments of the present invention and various embodiments into which the technical features of the present invention are incorporated can be derived and understood by persons skilled in the art from the following detailed description of the present invention.

Advantageous Effects

The effects of the device according to the present invention are as follows.

Embodiments may achieve a compact size of an element constituting an integrated circuit for controlling a lens by generating a driving voltage of the lens capable of adjusting a focal length using a negative voltage.

Further, embodiments may reduce the size of a circuit for generating a supply voltage for controlling a lens capable of adjusting a focal length, and raise productivity and decrease manufacturing cost because resolution and a range may be ensured even by a low-end control circuit.

Still further, embodiments increase a range within which an image may be corrected through optical image stabilization (OIS) and perform efficient image correction by performing a stable optical image stabilization function, i.e., OIS function even when there is a big difference in driving voltage between electrodes in a process of controlling movement of an interface in a liquid lens.

It will be appreciated by persons skilled in the art that that the effects that can be achieved through the present invention are not limited to what has been particularly described hereinabove and other advantages of the present invention will be more clearly understood from the following detailed description.

BEST MODE

Figure 1A:
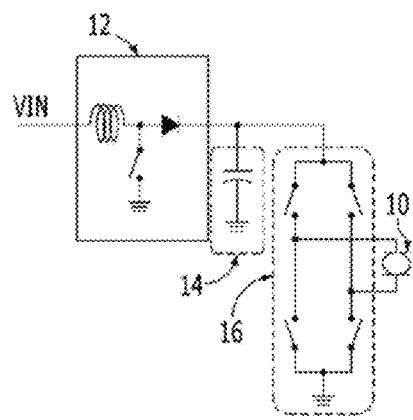
FIGS. 1A-1B illustrate problems of a method of controlling a lens capable of adjusting a focal length using electrical energy.

Reference will now be made in detail to embodiments, examples of which are illustrated in the accompanying drawings. While the disclosure is susceptible to various modifications and alternative forms, specific embodiments thereof are shown by way of example in the drawings. However, the disclosure should not be construed as limited to the embodiments set forth herein, but on the contrary, the disclosure is to cover all modifications, equivalents, and alternatives falling within the spirit and scope of the embodiments.

While terms, such as "first", "second", etc., may be used to describe various components, such components must not be limited by the above terms. The above terms are used only to distinguish one component from another. In addition, terms particularly defined in consideration of construction and operation of the embodiments are used only to describe the embodiments and do not define the scope of the embodiments.

In the description of the embodiments, it will be understood that, when an element is referred to as being formed "on" or "under" another element, it can be directly "on" or "under" the other element or be indirectly formed with intervening elements therebetween. It will also be understood that, when an element is referred to as being "on" or "under," "under the element" as well as "on the element" can be included based on the element.

As used herein, relational terms, such as "on"/"upper part"/"above", "under"/"lower part"/"below," and the like, are used solely to distinguish one entity or element from another entity or element without necessarily requiring or implying any physical or logical relationship or order between such entities or elements.

Figure 1B:
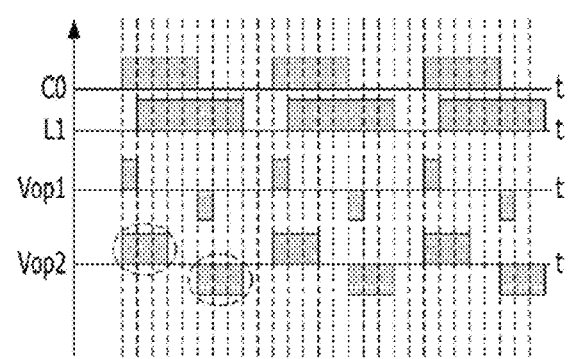

FIG. 1A-1B illustrate problems of a method of controlling a lens capable of adjusting a focal length using electrical energy. Specifically, FIG. 1A illustrates a control circuit for applying a driving voltage to a lens and FIG. 1B is a waveform diagram illustrating a method of applying a driving voltage to a lens.

Referring to FIG. 1A, the control circuit may include a voltage booster 12 for receiving a supply voltage VIN and boosting the level of the received voltage, a voltage stabilizer 14 for stabilizing the output of the voltage booster 12, and a switching unit 16 for selectively supplying the output of the voltage booster 12 to a lens 10.

Herein, the switching unit 16 may include a circuit configuration typically called an H bridge. A high voltage output from the voltage booster 12 is applied as a power voltage of the switching unit 16. The switching unit 16 may selectively supply the applied power voltage and a ground voltage to both terminals of the lens 10.

Referring to FIG. 1B, a voltage of a pulse type having a predetermined width may be applied to the both terminals of the lens 10, i.e., a common terminal C0 and an individual electrode L1. A driving voltage Vop applied to the lens 10 corresponds to the difference in voltage between the common terminal C0 and the individual electrode L1. Accordingly, if a voltage of the same level is applied with a time difference to the common terminal C0 and the individual electrode L1, it may be understood that the driving voltage Vop of 0 V is applied to the lens 10. Referring to FIG. 1B, when the same voltage is applied through the common terminal C0, it may be understood that driving voltages Vop1 and Vop2 having pulse widths different from each other are applied to both terminals of the lens 10 according as a voltage applied to the individual electrode L1 has a time difference with the voltage applied to the common terminal C0.

In this case, an operating voltage output from the voltage booster 12 has a level of about 70 V. Therefore, elements included in the switching unit 16 need to be driven at a high voltage of a level of 70 V. The elements that should be driven at the high voltage have difficulty in being miniaturized. The elements that may be driven at the high voltage should satisfy characteristics of a breakdown voltage, specific on-resistance, a safe operating area (SOA), and a maximum forward voltage. If the elements operating at the high voltage are made excessively small, an element such as a transistor may not perform a function of switching or amplification. For these reasons, it is difficult to miniaturize a control circuit for supplying a driving voltage of the lens 10 and production cost may be raised due to low productivity.

Figure 2:
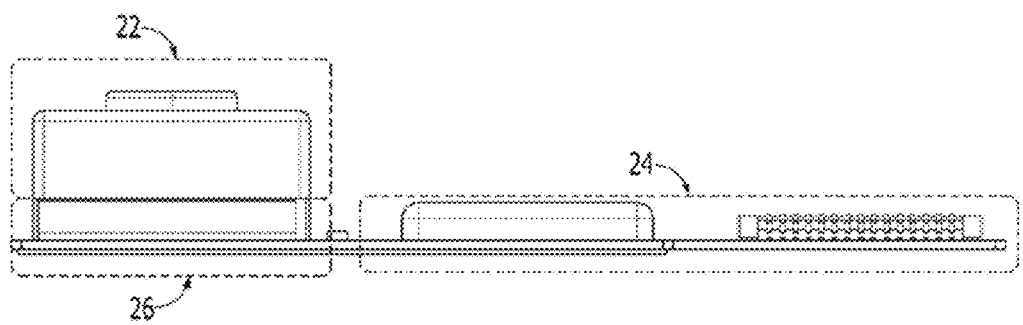
FIG. 2 illustrates an example of a camera module.

FIG. 2 is a cross-sectional view of a camera module according to an embodiment.

The camera module illustrated in FIG. 2 may include a lens assembly 22, a control circuit 24, and an image sensor 26.

The lens assembly 22 may include a plurality of lenses. The plural lenses may include a first lens, a focal length of which is adjusted in correspondence to a driving voltage applied between a common terminal and a plurality of individual electrodes.

The control circuit 24 may serve to supply the driving voltage to the first lens.

The image sensor 26 is aligned with the lens assembly 22 and may convert light transmitted through the lens assembly 22 into an electrical signal.

Referring to FIG. 2, the camera module may include the plural circuits 24 and 26 and the lens assembly 22 including a plurality of lenses, which are formed on one printed circuit board (PCB), but this is purely exemplary and embodiments are not limited thereto. The construction of the control circuit 24 may be differently designed according to specifications required for the camera module. Particularly, if the magnitude of an operating voltage applied to the lens assembly 22 is reduced, the control circuit 24 may be implemented by a single chip. Then, the size of the camera module mounted in a portable device may be further reduced.

Figure 3:
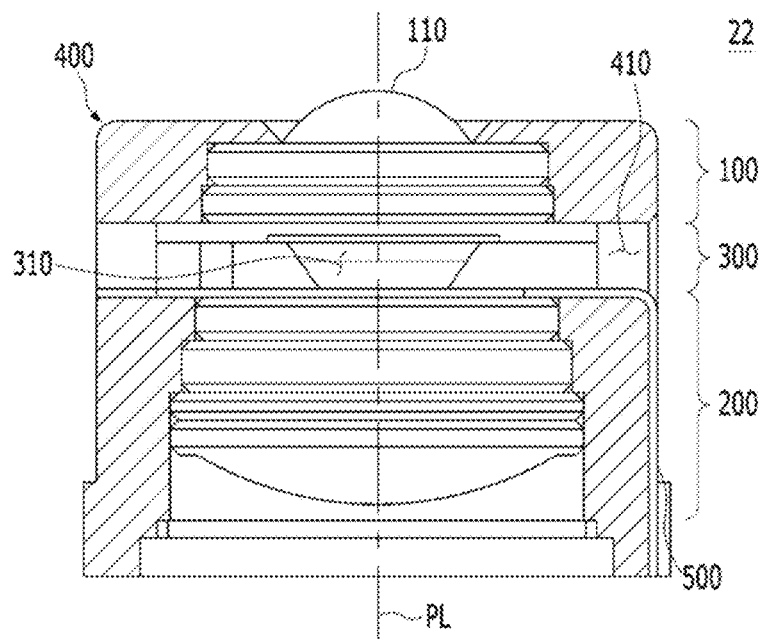
FIG. 3 illustrates an example of a lens assembly included in a camera module.

FIG. 3 is a cross-sectional view of the lens assembly 22 included in the camera module according to an embodiment.

The lens assembly 22 illustrated in FIG. 3 may include a first lens unit 100, a second lens unit 200, a liquid lens 300, a lens housing 400, and a connection terminal 500. The structure of the lens assembly 22 illustrated in FIG. 3 is purely exemplary and may differ according to specifications required for the camera module. For example, in the illustrated example, the liquid lens unit 300 is located between the first lens unit 100 and the second lens unit 200. However, as another example, the liquid lens unit 300 may be located on (in front of) the first lens unit 100.

Referring to FIG. 3, the first lens unit 100 is disposed at the front portion of the lens assembly and light is incident thereon from the exterior of the lens assembly. The first lens unit 100 may include at least one lens. Alternatively, the first lens unit 100 may include two or more lenses arranged based on a central axis PL to form an optical system.

The first lens unit 100 and second lens unit 200 may be mounted in the lens housing 400. In this case, a through hole may be formed in the lens housing 400 and the first lens unit 100 and the second lens unit 200 may be arranged in the through hole. In addition, the liquid lens unit 300 may be inserted into a space between the first lens unit 100 and the second lens unit 200 arranged in the lens housing 400.

Meanwhile, the first lens unit 100 may include an exposure lens 110. The exposure lens 110 is extruded to the exterior of the lens housing 400 so that the exposure lens 110 may be externally exposed. Since the exposure lens 110 is exposed to the exterior, the surface thereof may be damaged. If the surface of the exposure lens 110 is damaged, the picture quality of an image captured by the camera module may be deteriorated. To inhibit or suppress the surface of the exposure lens 110 from being damaged, a cover glass (not illustrated) may be disposed on the exposure lens 110 or a coating layer (not illustrated) may be formed on the exposure lens 110. Alternatively, the exposure lens 110 may be formed of an abrasion-resistant material.

The second lens unit 200 may be disposed at the back side of the first lens unit 100 and the liquid lens unit 300 and light incident from the exterior to the first lens unit 100 may pass through the liquid lens unit 300 and then may be incident to the second lens unit 200. The second lens unit 200 may be separated from the first lens unit 100 and may be disposed in the through hole formed in the lens housing 400.

Meanwhile, the second lens unit 200 may include at least one lens. If the second lens unit 200 includes two or more lenses, the plural lenses may be arranged based on the central axis PL to form an optical system.

The liquid lens unit 300 may be disposed between the first lens unit 100 and the second lens unit 200 and may be inserted into an insertion hole 410 of the lens housing 400. The liquid lens unit 300 may also be arranged based on the central axis PL, like the first lens unit 100 and the second lens unit 200.

A lens region 310 may be included in the liquid lens unit 300. The lens region 310 is a region to which light which has passed through the first lens unit 100 is transmitted and may include liquid in at least a part thereof. For example, the lens region 310 may include two types of liquids, i.e., a conductive liquid and a non-conductive liquid. The conductive liquid and the non-conductive liquid may not be mixed to form an interface. The interface of the conductive liquid and the nonconductive liquid may be modified by a driving voltage applied through the connection terminal 500, so that the curvature and focal length of the liquid lens unit 300 may be changed. If the modification of the interface and change of the curvature of the liquid lens unit are controlled, the liquid lens unit 300, and the lens assembly and the camera module including the liquid lens unit 300 may perform an optical zoom function, an AF function, and an OIS function, etc.

Figure 4A:
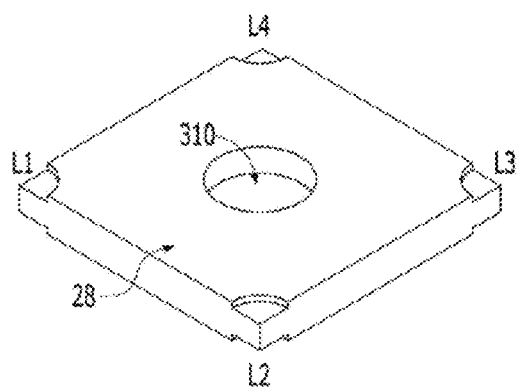
FIGS. 4A-4B illustrate a liquid lens, a focal length of which is adjusted in correspondence to a driving voltage.
Figure 4B:
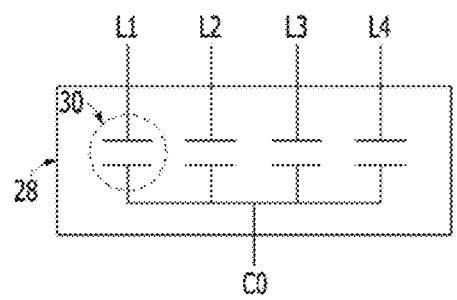

FIG. 4A and FIG. 4B illustrate a lens, a focal length of which is adjusted in correspondence to a driving voltage. Specifically, FIG. 4A illustrates a first lens 28 included in the lens assembly 22 (refer to FIG. 3) and FIG. 4B is an equivalent circuit of the lens 28.

First, referring to FIG. 4A, the lens 28, a focal length of which is adjusted according to a driving voltage, may receive an operating voltage through individual electrodes L1, L2, L3, and L4. The individual electrodes may have the same angular distance and may include four individual electrodes arranged in different directions. If the operating voltage is applied through the individual electrodes L1, L2, L3, and L4, an interface of a conductive liquid and a nonconductive liquid formed in the lens region 310 may be modified.

In addition, referring to FIG. 4B, the lens 28 may be regarded as a plurality of capacitors 30 each having one terminal configured to receive the operating voltage from the different individual electrodes L1, L2, L3, and L4 and the other terminal connected to a common terminal C0. Herein, each of the plural capacitors 30 included in the equivalent circuit may have small capacitance of a level of about 200 pico-Farad (pF).

FIG. 5A-5D illustrate movement of an interface of a liquid lens. Specifically, FIGS. 5A-5D illustrate movements of interfaces 30a, 30b, 30c, and 30d which may occur when driving voltages are applied to individual electrodes L1, L2, L3, and L4 of the liquid lens 28.

Figure 5A:
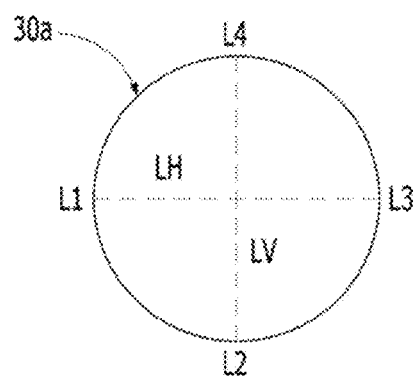
FIGS. 5A-5D illustrate movement of an interface of a liquid lens.

First, referring to FIG. 5A, if substantially the same driving voltages are applied to the individual electrodes L1, L2, L3, and L4 of the liquid lens 28, an interface 30a may maintain a shape similar to a circle. In this case, since there is no substantial difference between each of the driving voltages applied to the first and third individual electrodes L1 and L3, respectively, and each of the driving voltages applied to the second and fourth individual electrodes L2 and L4, respectively, a distance LH between the first and third individual electrodes L1 and L3 is substantially the same as a distance LV between the second and forth individual electrodes L2 and L4 and movement of the interface 30a (e.g., a slant angle) may keep equilibrium.

Figure 5B:
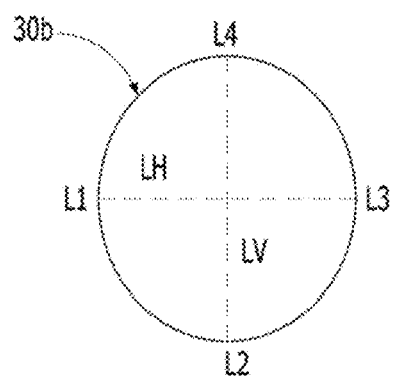

Referring to FIG. 5B, the case is illustrated in which each of the driving voltages applied to the first and third individual electrodes L1 and L3 of the liquid lens 28, respectively, is slightly lower than each of the driving voltages applied to the second and fourth individual electrodes L2 and L4, respectively. In this case, since force pulling or pushing the interface 30b may differ in a horizontal direction and a vertical direction, the length of the horizontal direction (i.e., the distance LH between the first and third individual electrodes L1 and L3) may be shorter than the distance of the vertical direction (i.e., the distance LV between the second and fourth individual electrodes L2 and L4). If each of the driving voltages applied to the second and fourth individual electrodes L2 and L4, respectively, is higher than each of the driving voltages applied to the first and third individual electrodes L1 and L3, respectively, since a slant angle of the interface 30b of the liquid lens 28 in the second and fourth individual electrodes L2 and L4 is higher than a slant angle of the interface 30b of the liquid lens 28 in the first and third individual electrodes L1 and L3, the length LV of the vertical direction is longer than the length LH in the horizontal direction although they appear to be same in the plane.

Figure 5C:
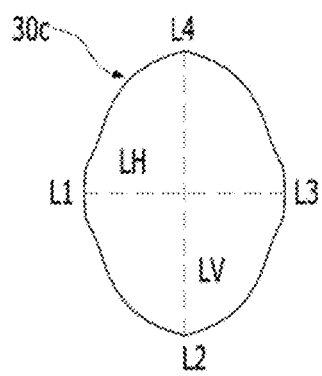

Referring to FIG. 5C, the case is illustrated in which the difference between the respective driving voltages applied to the first and third individual electrodes L1 and L3 of the liquid lens 28 and the respective driving voltages applied to the second and fourth individual electrodes L2 and L4 of the liquid lens 28 is large. In this case, since force pulling or pushing the interface 30c may greatly differ in the horizontal direction and the vertical direction, the outer shape, i.e., an edge, of the interface 30c may be curved or twisted. This phenomenon may result in distortion of the liquid lens 28. When the respective driving voltages applied to the first and third individual electrodes L1 and L3 of the liquid lens 28 and the respective driving voltages applied to the second and fourth individual electrodes L2 and L4 of the liquid lens 28 are different to some degree, whether the liquid lens 28 is distorted and a distortion level of the liquid lens 28 may differ according to the structure and properties of the liquid lens 28. For example, a slant of 0.6° or more in a specific direction is compensated for by an OIS function, the interface 30c of the liquid lens 28 may be twisted. In this case, the difference between the length of the horizontal direction (i.e., the length LH between the first and third individual electrodes L1 and L3) and the length of the vertical direction (i.e., the distance LV between the second and fourth individual electrodes L2 and L4) may further increase compared with the case of the interface 30*b* described with reference to FIG. 5B.

Figure 5D:
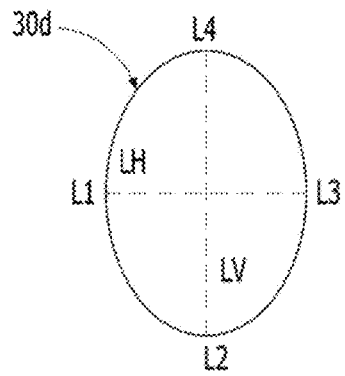

Referring to FIG. 5D, when the driving voltages applied to the first and third individual electrodes L1 and L3 of the liquid lens 28 and the driving voltages applied to the second and fourth individual electrodes L2 and L4 of the liquid lens 28 differ by a preset level or more, the outer shape, i.e., the edge, of the interface 30*d* can be inhibited from being curved or the interface 30*d* may be inhibited from being twisted, by floating the first and third individual electrodes L1 and L3 in a state in which the driving voltages applied to the second and fourth individual electrodes L2 and L4 are maintained. Herein, floating state, which is well-known to the person skilled in the art, may mean an unknown state because the state is floated. The floating state may be formed by cutting off connecting a first voltage, a second voltage, and a ground voltage to a corresponding electrode. The floating state may be a state in which connection between a voltage source and a ground (reference voltage) is cut off. If a part of electrodes included in the liquid lens 28 is floated during a preset time or duration, force in a direction in which a corresponding electrode is located may be temporarily stopped. It may be difficult to clearly explain a potential difference of a floated electrode. However, in FIG. 5D, the interface 30*d* may induce natural balance of force through floating, unlike the case of FIG. 5C in which unbalance occurs by applying force to the interface 30*c* in a specific direction. Accordingly, even when the difference between the length of the horizontal direction (i.e., the distance LH between the first and third individual electrodes L1 and L3) and the length in the vertical direction (i.e., the distance LV between the second and fourth individual electrodes L2 and L4) is large, the liquid lens 28 may be inhibited from being distorted.

Figure 6:
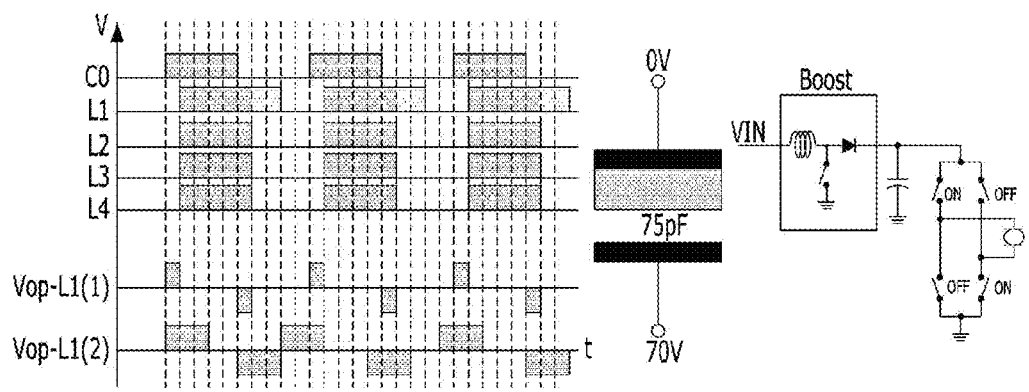
FIG. 6 illustrates a first driving method of a liquid lens.

FIG. 6 is a diagram for explaining a first driving method of a liquid lens according to an embodiment.

As illustrated, an interface of the liquid lens may be controlled by applying preset voltages (e.g., a ground voltage of 0 V and a high voltage of 70 V) to a plurality of individual electrodes L1, L2, L3, and L4 and a common electrode C0 of the liquid lens. In the present specification, the ground voltage may be a reference potential in a control circuit and a reference voltage of the control circuit.

Movement of the interface of the liquid lens may be controlled by potential differences between the individual electrodes and the common electrode. To apply a ground voltage of 0 V to one electrode of the liquid lens and a high voltage of 70 V to another electrode of the liquid lens, an operation of turning on a switch connected between the ground voltage 0 V and one electrode and on operation of turning on a switch capable of supplying the high voltage of 70 V output from a voltage booster in the control circuit to the other electrode may be performed.

Figure 7:
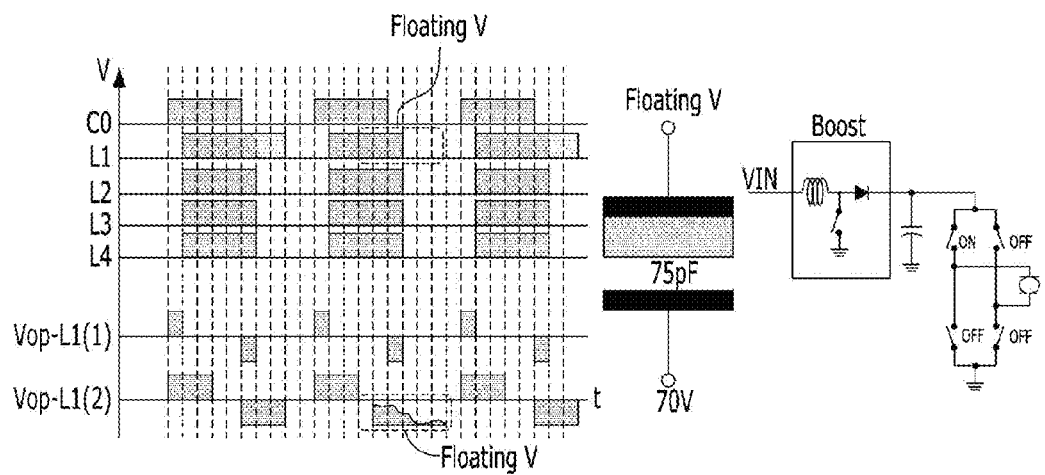
FIG. 7 illustrates a second driving method of a liquid lens.

FIG. 7 is a diagram for explaining a second driving method of a liquid lens according to an embodiment.

As illustrated, an interface of the liquid lens may be controlled by applying preset voltages (e.g., a ground voltage of 0 V and a high voltage of 70 V) to a plurality of individual electrodes L1, L2, L3, and L4 and a common electrode C0 of the liquid lens. Unlike FIG. 6, some electrodes may be floated to control the interface of the liquid lens in FIG. 7. For example, during the predetermined time, the high voltage of 70 V may be applied to one electrode of the liquid lens and the other electrode of the liquid lens may be maintained in a floated state, rather than applying the ground voltage of 0 V to the other electrode of the liquid lens.

Specifically, a timing chart of a case 1 in which the first individual electrode L1 is not floated may be compared with a timing chart of a case 2 in which the first individual electrode L1 is floated. If the first individual electrode L1 is floated, a floating voltage V may be a free state although it is difficult to clearly explain the floating voltage. For example, if the first individual electrode L1 is floated, the potential of the first individual electrode L1 may gradually decrease or may repeat rising and lowering. However, if the high voltage of 70 V is applied to the first individual electrode L1 in a free state and then the first individual electrode L1 enters a floating state, it may be assumed that the potential of the first individual electrode L1 will gradually decrease. If partial electrodes maintain a floating state that cannot be known and a driving voltage is applied to the other electrodes, a correction value increases as in FIG. 5D and, if the difference between driving voltages is big, natural balance of force may be induced.

Figure 8:
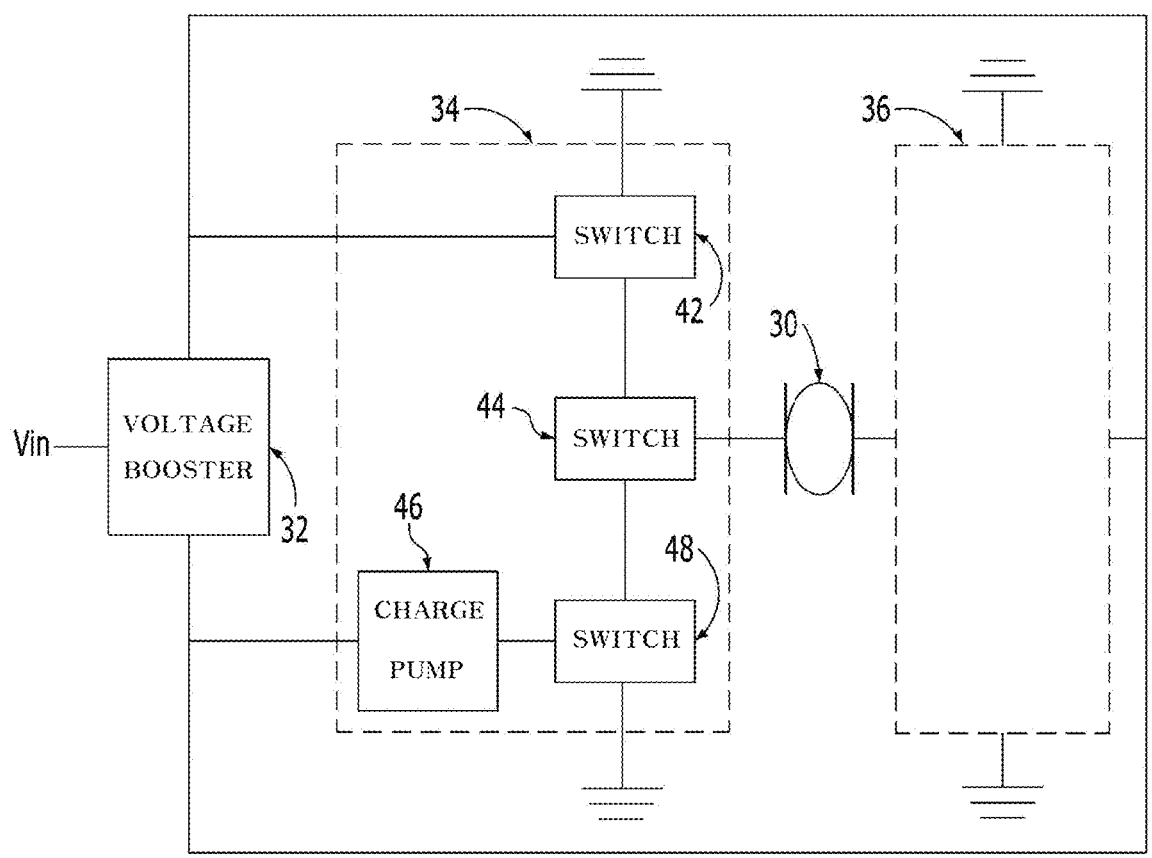
FIG. 8 illustrates a first embodiment of a control circuit.

FIG. 8 is a diagram illustrating a first embodiment of a control circuit. Herein, the control circuit is a circuit for applying an operating voltage to the lens 28 (refer to FIGS. 4A-4B) which is included in the lens assembly 22 and has a focal distance adjusted according to a driving voltage. Referring to the equivalent circuit of the lens 28, the lens 28 may be regarded as including the plural capacitors 30 and the individual electrodes L1, L2, L3, and L4 for supplying the operating voltage to the respective capacitors 30 may be independently controlled. Hereinafter, for convenience of description, one capacitor 30 connected to one individual terminal will be explained by way of example to describe the control circuit.

The control circuit illustrated in FIG. 8 may include an individual electrode controller 34 and a common terminal controller 36. The individual electrode controller 34 and the common terminal controller 36 may receive a ground voltage as a power voltage and receive an operating voltage having the magnitude of ½ of a driving voltage from a voltage booster 32. The individual electrode controller 34 may supply the operating voltage to the individual electrode of the capacitor 30 in the form of a positive voltage and a negative voltage and the common terminal controller 36 may supply the operating voltage to the common terminal of the capacitor 30 in the form of the positive voltage and the negative voltage. The individual electrode controller 34 may supply the operating voltage to the individual electrode in the form of the positive voltage and the negative voltage when a ground voltage, a reference potential, or a reference voltage is regarded as 0 V, and the common terminal controller 36 may supply the operating voltage to the common electrode of the capacitor 30 in the form of the positive voltage and the negative voltage. The individual electrode controller 34 and the common terminal controller 36 may have substantially the same construction. Hereinafter, the individual electrode controller 34 will be described in more detail.

The individual electrode controller 34 may include a charge pump 46 for adjusting the operating voltage provided by a voltage booster 32 to a negative voltage. The individual electrode controller 34 may also include a switching unit including a plurality of switches. The switching unit may include a first switch 42 for selecting one of the ground voltage and the operating voltage, a second switch 48 for selecting one of an output of the charge pump 46 and the ground voltage, and a third switch 44 for selecting one of outputs of the first switch 42 and the second switch 48 and applying the selected output to the individual electrode of the capacitor 30. Herein, each of the first switch 42, the second switch 48, and the third switch 44 may include at least one transistor. For example, each of the switches 42, 48, 44 may include two transistors.

Meanwhile, the first switch 42 and the second switch 48 in the individual electrode controller 34 may use the ground voltage as a bias voltage to determine the operating voltage applied to the individual electrode or the common electrode of the capacitor 30.

The control circuit may further include the voltage booster 32 for converting a supply voltage Vin to the magnitude of the operating voltage. For example, the supply voltage input to the voltage booster 32 may have a level of 2.5 V to 3.0 V and the operating voltage output by the voltage booster 32 may have a level of 30 V to 40 V. Herein, the supply voltage input to the voltage booster 32 may be an operating voltage of a portable device in which a camera module is mounted.

Meanwhile, the individual electrode controller 34 and the common terminal controller 36 receive the ground voltage as the power voltage. Therefore, power consumption may be reduced as compared with the case in which the operating voltage, which is the output of the voltage booster 32, is applied as the power voltage. For example, when it is unnecessary for the control circuit to operate, if the operating voltage, which is the output of the voltage booster 32, is applied as the power voltage, the operating voltage is not transmitted to the capacitor 30 by the switches 42, 44, and 48. However, since the operating voltage continues to be applied to the switches, power consumption may occur. It may be important to reduce power consumption in the camera module mounted in the portable device. Therefore, the output of the voltage booster 32 is not provided as the power voltage of the individual electrode controller 34 and the common terminal controller 36 and is connected to the switch 42.

Figure 9:
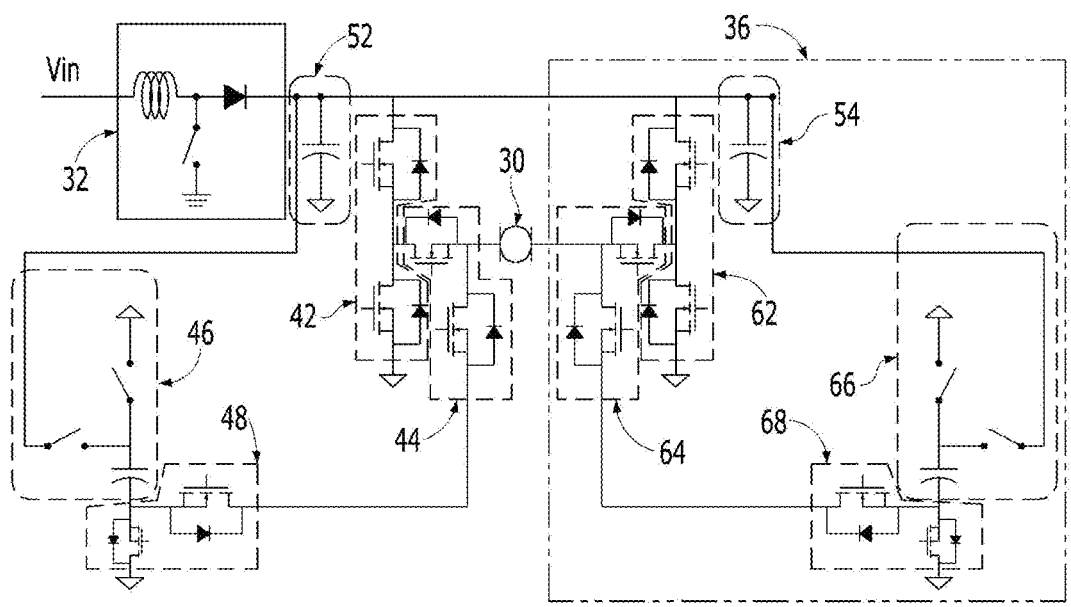
FIG. 9 illustrates a second embodiment of a control circuit.

FIG. 9 illustrates a second embodiment of the control circuit.

As illustrated, the control circuit connected to a voltage booster 32 for receiving a supply voltage Vin and outputting an operating voltage may control a voltage applied to an individual electrode of a capacitor 30.

The control circuit may include a first voltage stabilizer 52 for stabilizing the output of the voltage booster 32. The output of the voltage booster 32 may be transmitted to a first charge pump 46. The first charge pump 46 may include a first element for selectively transmitting a ground voltage, a second element for selectively transmitting an operating voltage, and a first capacitor located between the outputs of the first and second elements and a switching unit. Each of the first and second elements may include a transistor.

Meanwhile, a first switch 42 for selecting one of the ground voltage and the operating voltage may include a third element for selectively transmitting the ground voltage and a fourth element for selectively transmitting the operating voltage.

A second switch 48 for selecting one of the output of the first charge pump 46 and the ground voltage may include a fifth element for selectively transmitting the output of the first charge pump 46 and a sixth element for selectively transmitting the ground voltage. Thus, both the first switch 42 and the second switch 48 may selectively transmit the ground voltage. Since both the first switch 42 and the second switch 48 may transmit the ground voltage as the operating voltage applied to one terminal of the capacitor 30, if one of the two switches transmits the operating voltage, the other may be connected to the ground voltage. Therefore, a positive voltage or a negative voltage of the operating voltage may be determined.

A third switch 44 for selecting one of the outputs of the first switch 42 and the second switch 48 and applying the selected output to the individual electrode of the capacitor 30 may include a seventh element for selectively transmitting the output of the first switch 42 and an eighth element for selectively transmitting the output of the second switch 48.

The control circuit may include a common terminal controller 36. The common terminal controller 36 may include a second voltage stabilizer 54, a second charge pump 66, a fourth switch 62, a fifth switch 68, and a sixth switch 64. Herein, the second voltage stabilizer 54 may have the same construction as the first voltage stabilizer [[54]]52 and the second charge pump 66 may have the same construction as the first charge pump 46. The fourth switch 62 may have the same construction as the first switch 42, the fifth switch 68 may have the same construction as the second switch 48, and the sixth switch 64 may have the same construction as the third switch 44.

Figure 10:
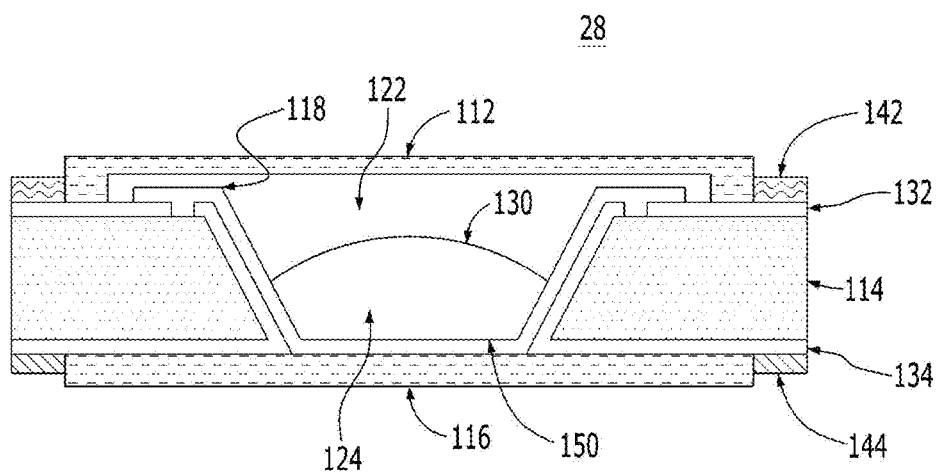
FIG. 10 illustrates the structure of a liquid lens.

FIG. 10 is a cross-sectional diagram of a liquid lens according to an embodiment.

As illustrated, a liquid lens 28 may include a liquid, a first plate 114, and electrodes. Liquids 122 and 124 included in the liquid lens 28 may include a conductive liquid and a nonconductive liquid. The first plate 114 may include a cavity 150 in which the conductive liquid and the nonconductive liquid are disposed. The cavity 150 may include a slanted surface. Electrodes 132 and 134 may be disposed on the first plate 114. That is, the electrodes 132 and 134 may be disposed at the upper portion of the first plate 114 and the lower portion of the first plate 114, respectively. The liquid lens 28 may further include a second plate 112 which may be disposed at the upper (or lower) portion of the electrodes 132 and 134. The liquid lens 28 may further include a third plate 116 which may be disposed at the lower (or upper) portion of the electrodes 132 and 134. As illustrated, an embodiment of the liquid lens 28 may include an interface 130 formed by the two different liquids 122 and 124. An embodiment of the liquid lens 28 may include at least one or more substrates 142 and 144 for supplying a voltage to the liquid lens 28. An edge of the liquid lens 28 may be thinner in thickness than the center of the liquid lens 28.

The liquid lens 28 includes two different liquids, for example, the conductive liquid 122 and the nonconductive liquid 124. The curvature and shape of the interface 130 formed by the two liquids may be adjusted by a driving voltage applied to the liquid lens 28. The driving voltage supplied to the liquid lens 28 may be transmitted through the first substrate 142 and the second substrate 144. The second substrate 144 may transmit four distinguishable individual driving voltages and the first substrate 142 may transmit one common voltage. Voltages supplied through the second substrate 144 and the first substrate 142 may be applied to the plural electrodes 134 and 132 exposed to each edge of the liquid lens 28.

The liquid lens 28 may include the third plate 116 and the second plate 112 having a transparent material and the first plate 114 which is disposed between the third plate 116 and the second plate 112. The first plate 114 may include an opening area having a slanted surface which is predetermined.

The liquid lens 28 may include the cavity 150 determined by the third plate 116, the second plate 112, and the opening area of the first plate 114. Herein, the cavity 150 may be filled with the two liquids 122 and 124 having different properties (e.g., a conductive liquid and a nonconductive liquid) and the interface 130 may be formed between the two liquids 122 and 124 having different properties.

At least one of the two liquids 122 and 124 included in the liquid lens 28 is conductive. The liquid lens 28 may further include an insulation layer 118 disposed on the two electrodes 132 and 134 disposed on the upper portion and lower portion of the first plate 114 and on a slanted surface at which the conductive liquid may touch. The insulation layer 118 covers one electrode (e.g., the second electrode 134) of the two electrodes 132 and 134 and exposes a part of the other electrode (e.g., the first electrode 132) so that electrical energy may be applied to the conductive liquid (e.g., 122). Herein, the first electrode 132 may include at least one electrode sector (e.g., C0) and the second electrode 134 may include two or more electrode sectors (e.g., L1, L2, L3, and L4 of FIG. 4A-4B). For example, the second electrode 134 may include a plurality of electrode sectors which are sequentially disposed clockwise based on an optical axis. In the present specification, an electrode sector may be called a subelectrode.

One or more substrates 142 and 144 may be connected to transmit a driving voltage to the two electrodes 132 and 134 included in the liquid lens 28. A focal length of the liquid lens 28 may be adjusted by changing the curvature and slant level of the interface 130 formed in the liquid lens according to the driving voltage.

Figure 11:
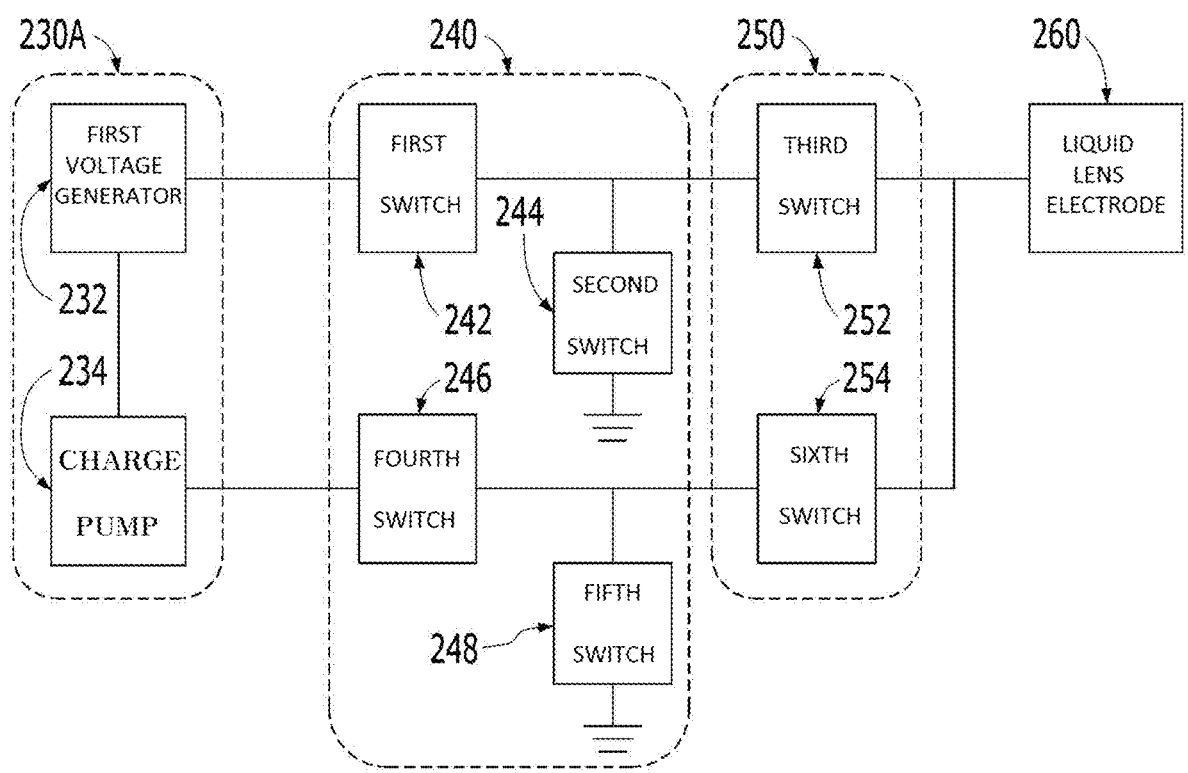
FIG. 11 illustrates a third embodiment of a control circuit.

FIG. 11 illustrates a third embodiment of the control circuit.

As illustrated, the control circuit may include a driving voltage output unit 230A for outputting a voltage of a preset magnitude having a polarity (positive polarity or negative polarity), a first switching unit 240 for selectively transmitting one of a voltage transmitted by the driving voltage output unit 230A and a ground voltage, and a second switching unit 250 for selectively transmitting a driving voltage transmitted by the first switching unit 240 to an electrode 260 of the liquid lens 28 (refer to FIG. 7).

The driving voltage output unit 230A may include a first voltage generator for increasing the magnitude of a power voltage or a supply voltage to a preset magnitude and outputting a first voltage of the increased magnitude, and a charge pump 234 for receiving the first voltage from the first voltage generator 232, changing the polarity of the first voltage, and outputting a second voltage having the changed polarity.

The first switching unit 240 may include a first switch 242 for selectively transmitting the first voltage transmitted by the first voltage generator 232 and a second switch 244 for selectively transmitting a first ground voltage. The first switching unit 240 may further include a fourth switch 246 for selectively transmitting the second voltage transmitted by the charge pump 234 and a fifth switch 248 for selectively transmitting a second ground voltage.

The first switching unit 240 may include two different input terminals and two different output terminals. The first ground voltage and the second ground voltage may be electrically connected to each other.

The second switching unit 250 may include a third switch 252 and a sixth switch 254. The third switch 252 may selectively transmit one of the received first voltage and first ground voltage to the liquid lens electrode 260 and the sixth switch 254 may selectively transmit one of the received second voltage and second ground voltage to the liquid lens electrode 260.

The first switching unit 240 may be commonly disposed in electrodes included in the liquid lens 28. For example, the first switching unit 240 may be shared between a plurality of individual electrodes included in the liquid lens and the driving voltage may be transmitted to the plural individual electrodes through at least one first switching unit 240.

On the other hand, the second switching unit 250 needs to be individually disposed in each electrode included in the liquid lens 28. For example, the second switching unit 250 may be independently connected to each of the plural individual electrodes included in the liquid lens 28, so that the second switching unit 250 may not be shared between the liquid lens electrodes 260.

Figure 12:
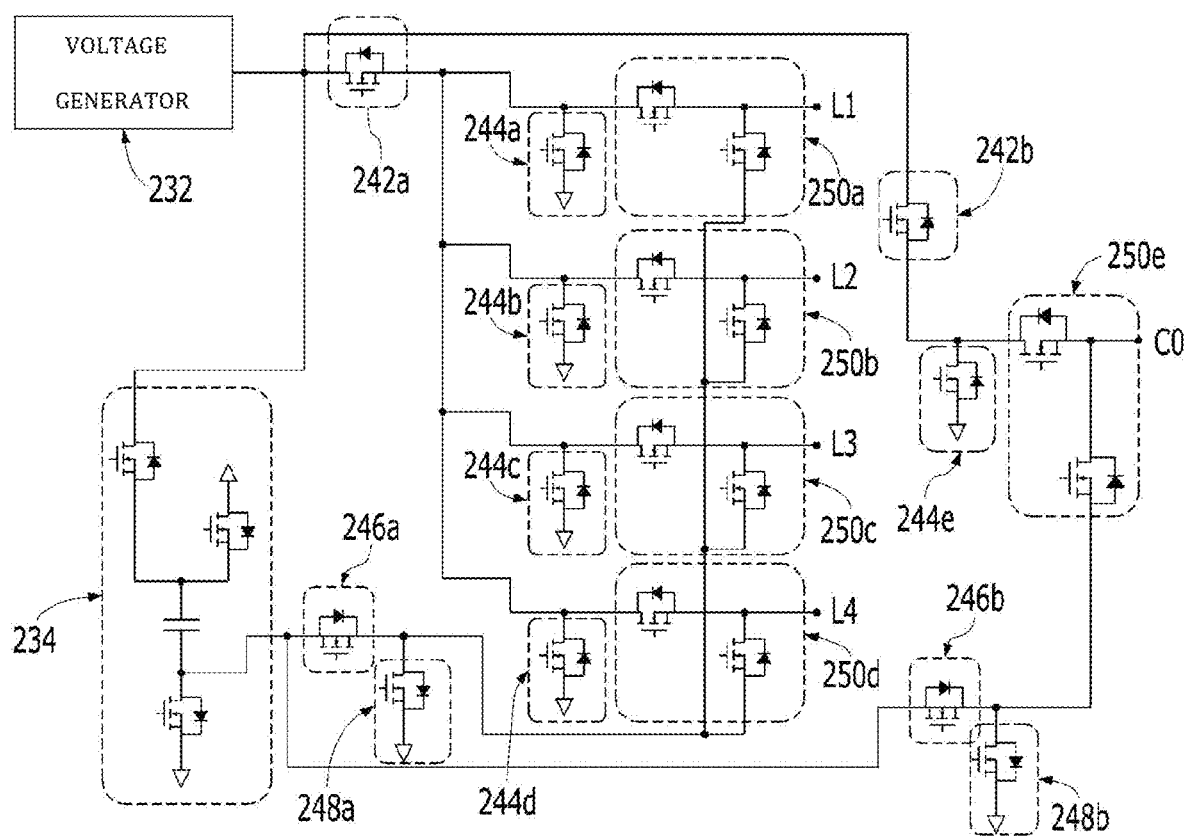
FIG. 12 illustrates a fourth embodiment of a control circuit.

FIG. 12 illustrates a fourth embodiment of the control circuit.

As illustrated, the control circuit may include a voltage generator 232 for generating a voltage having a preset polarity and magnitude, a charge pump 234 for converting the polarity of a voltage generated by the voltage generator 232, a plurality of switching elements 242a, 242b, 244a, 244b, 244c, 244d, 244e, 246a, 246b, 248a, and 248b for transmitting a driving voltage to a plurality of electrodes L1, L2, L3, L4, and C0 included in a liquid lens, and a plurality of second switching units 250a, 250b, 250c, 250d, and 250e for selectively transmitting voltages transmitted by the plural switching elements 242a, 242b, 244a, 244b, 244c, 244d, 244e, 246a, 246b, 248a, and 248b to the plural electrodes L1, L2, L3, L4, and C0 included in the liquid lens. Herein the plural switching elements 242a, 242b, 244a, 244b, 244c, 244d, 244e, 246a, 246b, 248a, and 248b may correspond to the first switching unit 240 described with reference to FIG.

Except for the three switch elements included in the charge pump 234, the 6 switches elements, i.e., the first to sixth switches 242, 244, 246, 248, 252, and 254 may be connected to each liquid lens electrode 260 according to the control circuit described with reference to FIG. 11. However, in the control circuit described with reference to FIG. 12, partial switch elements disposed in the individual electrodes L1, L2, L3, and L4 among the plural electrodes L1, L2, L3, L4, and C0 included in the liquid lens are commonly connected, thereby reducing the number of switch elements. For example, when the liquid lens includes four individual electrodes and one common electrode, the control circuit described in FIG. 11 may include a total of 30 (=5×6) switching elements, whereas the control circuit described in FIG. 12 may include a total of 21 switching elements. That is, in FIG. 12, a total sum of 11 switching elements 242a, 242b, 244a, 244b, 244c, 244d, 244e, 246a, 246b, 248a, and 248b and two switching elements included in each of five second switching units 250a, 250b, 250c, 250d, and 250e is 21.

Figure 13:
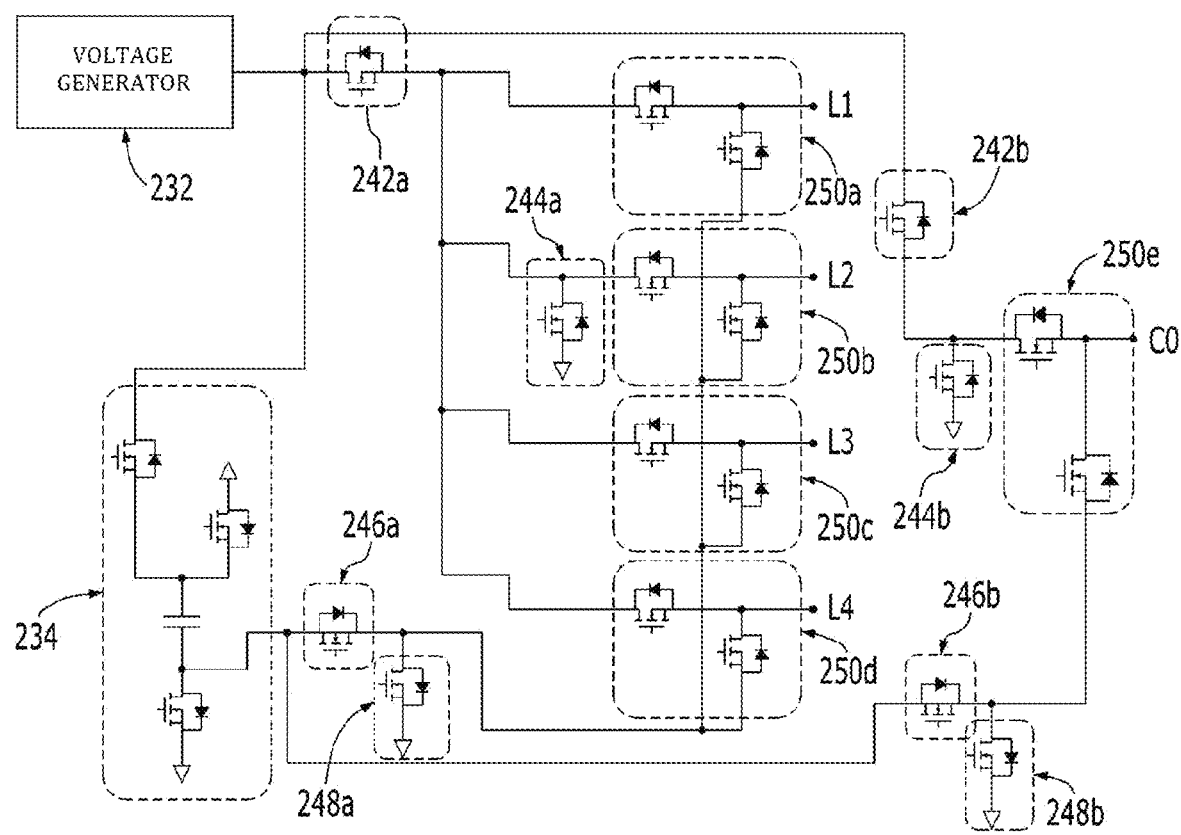
FIG. 13 illustrates a fifth embodiment of a control circuit.

FIG. 13 illustrates a fifth embodiment of the control circuit.

As illustrated, the control circuit may include a voltage generator 232 for generating a voltage having a preset polarity and magnitude, a charge pump 234 for converting the polarity of the voltage generated by the voltage generator 232, a plurality of switching elements 242a, 242b, 244a, 244b, 246a, 246b, 248a, and 248b for transmitting a driving voltage to a plurality of electrodes L1, L2, L3, L4, and C0 included in a liquid lens, and a plurality of second switching units 250a, 250b, 250c, 250d, 250e for selectively transmitting voltages transmitted by the plural switching elements 242a, 242b, 244a, 244b, 246a, 246b, 248a, and 248b to the plural electrodes L1, L2, L3, L4, and C0 included in the liquid lens. Herein, the plural switching elements 242a, 242b, 244a, 244b, 246a, 246b, 248a, and 248b may correspond to the first switching unit 240 described with reference to FIG. 11.

Except for three switch elements included in the charge pump 234, when the liquid lens includes four individual electrodes and one common electrode, the control circuit described in FIG. 12 may include 21 switching elements, whereas the control circuit described in FIG. 13 may include 18 switching elements. Switching elements for selectively transmitting a ground voltage to each individual electrode included in the liquid lens may be connected commonly without being individually disposed, so that the number of switching elements included in the control circuit may be further reduced as illustrated in FIG. 13. If the number of switching elements is reduced, the total size of the control circuit may be reduced and power consumption may be decreased.

Referring to FIG. 13, the number of the plural switching elements 242a, 242b, 244a, 244b, 246a, 246b, 248a, and 248b corresponding to the first switching unit 240 described in FIG. 11 may be fixed regardless of the number of electrodes included in the liquid lens. For example, irrespective of whether 4, 8, 12, or 16 individual electrodes are included in the liquid lens, the first switching unit 240 shown in FIG. 11 may be implemented only by 8 switching elements. On the other hand, the number of switching elements included in the plural second switching units 250a, 250b, 250c, 250d, and 250e may be the number of electrodes included in the liquid lens, i.e., the sum of the number of individual electrodes and the number of common electrodes. In other words, the number of switching elements included in the plural second switching units 250a, 250b, 250c, 250d, and 250e may be twice the sum of the number of individual electrodes and the number of common electrodes included in the liquid lens. For example, if four individual electrodes and one common electrode are included in the liquid lens, the number of electrodes is 5 and the number of switching elements included in the plural second switching units may be 10.

If 8 individual electrodes and one common electrode are included in the liquid lens, the number of electrodes is 9 and the number of switching elements included in the plural second switching units may be 18.

According to an embodiment, even when the number of electrodes included in the liquid lens varies, the number of switching elements included in the driving voltage control circuit may be fixed.

Figure 14:
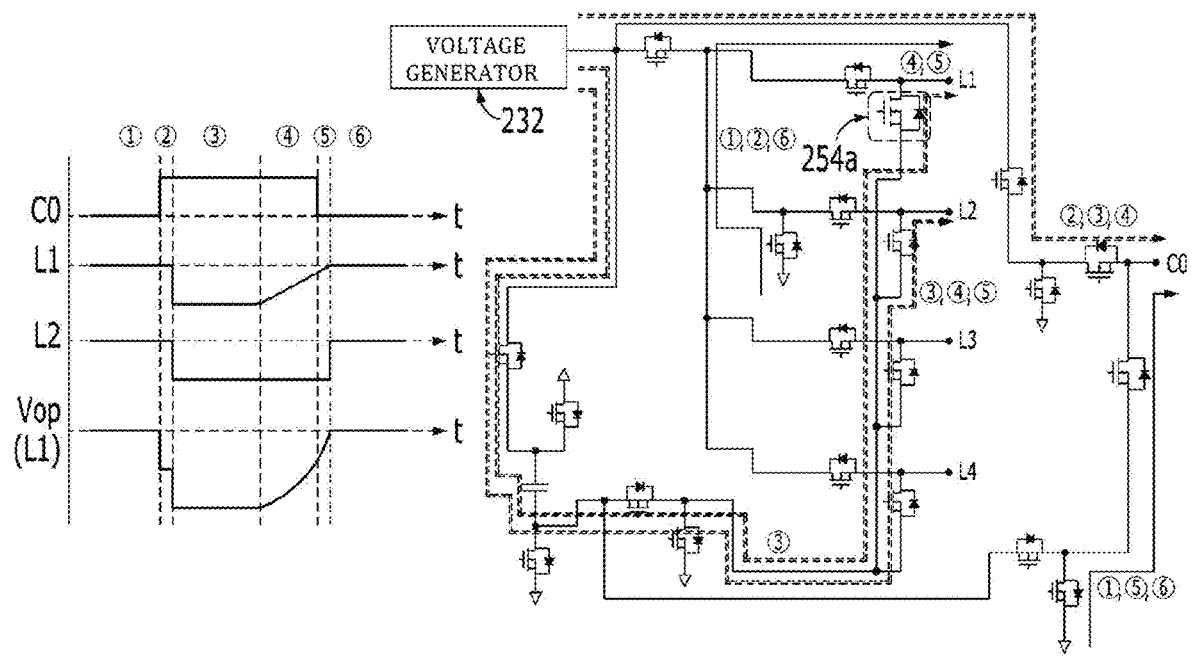
FIG. 14 illustrates a first operation example according to an embodiment of the control circuit illustrated in FIG. 13.

FIG. 14 is a diagram illustrating a first operation example according to an embodiment of the control circuit illustrated in FIG. 13.

The liquid lens 28 (refer to FIGS. 4A-4B and 10) includes four individual electrodes L1, L2, L3, and L4 and one common electrode C0 and it is assumed that the first individual electrode L1 and the third individual electrode L3 are symmetrically arranged based on the center of the liquid lens 28 and the second individual electrode L2 and the fourth individual electrode L4 are symmetrically arranged based on the center of the liquid lens 28. Hereinafter, for convenience of description, description will be given focusing on driving voltages applied to the first individual electrode L1, the second individual electrode L2, and the common electrode C0. Particularly, the case in which a positive voltage is applied to the common electrode C0 in FIG. 14 is explained.

If the first individual electrode L1 and the third individual electrode L3 are symmetrically arranged based on the center of the liquid lens 28 and the second individual electrode L2 and the fourth individual electrode L4 are symmetrically arranged based on the center of the liquid lens 28, the same driving voltages may be applied to the first individual electrode L1 and the third individual electrode L3 and the same driving voltages may be applied to the second individual electrode L2 and the fourth individual electrode L4. According to an embodiment, different driving voltages may be applied to the first individual electrode L1, the second individual electrode L2, the third individual electrode L3, and the fourth individual electrode L4. For example, the driving voltages symmetrical to or different from the driving voltages applied to the first and second individual electrodes L1 and L2 may be applied at the same time t to the third and fourth individual electrodes L3 and L4. That is, at the same time t, a driving voltage having the same level as or a different level from a driving voltage applied to the first individual electrode L1 may be applied to the third individual electrode L3 and a driving voltage having the same level as or a different level from a driving voltage applied to the second individual electrode L2 may be applied to the fourth individual electrode L4.

Referring to the timing chart illustrated in FIG. 14, a plurality of operating modes ①, ②, ③, ④, ⑤, and ⑥ may be present according to timings at which the driving voltage is applied to the first individual electrode L1, the second individual electrode L2, and the common electrode C0. In the first mode ①, a ground voltage is applied to all of the common electrode C0, the second individual electrode L2, and the first individual electrode L1. In the second mode ②, a positive voltage generated by the voltage generator 232 is applied to the common electrode C0 and the ground voltage is applied to each of the first individual electrode L1 and the second individual electrode L2. In the third mode ③, the positive voltage generated by the voltage generator 232 is applied to the common electrode C0 and a negative voltage transmitted by the charge pump is applied to each of the first individual electrode L1 and the second individual electrode L2. In the fourth mode ④, the first individual electrode L1 is floated and the second individual electrode L2 and the common electrode C0 are not floated. Then, in the fourth mode ④, the positive voltage generated by the voltage generator 232 is applied to the common electrode C0 and the negative voltage is applied to the second individual electrode L2, whereas the first individual electrode L1 is floated. Referring to the timing chart, although, in the fourth mode ④, the level of a voltage applied to the floated first individual electrode L1 is gradually raised, the voltage of the floated first individual electrode L1 may have a level which is difficult to predict. On the other hand, a potential difference between the second individual electrode L2 and the common electrode C0 which are not floated may be clear. In this way, although it is difficult to clearly explain the potential difference between the first individual electrode L1 and the common electrode C0, movement of charges may be naturally performed in a floated state as compared with artificial control of movement of charges. If movement of charges is naturally performed, the potential difference between the first individual electrode L1 and the common electrode C0 may be gradually reduced as illustrated in the timing chart. In the fifth mode ⑤, the ground voltage is applied to the common electrode C0 and the first individual electrode L1 is still floated, whereas the negative voltage transmitted by the charge pump is applied to the second individual electrode L2. In the sixth mode ⑥, the ground voltage is applied to all of the common electrode C0, the first individual electrode L1, and the second individual electrode L2.

In the first to sixth modes ①, ②, ③, ④, ⑤, and ⑥, movement of an interface 130 included in the liquid lens 28 may be determined by the magnitude of a driving voltage Vop applied between the common electrode C0 and the first individual electrode L1 or between the common electrode C0 and the second individual electrode L2. In this case, movement of the interface 130 may be controlled by an absolute value of the magnitude of the driving voltage Vop regardless of the polarity of the driving voltage Vop. For example, if the first individual electrode L1 and the third individual electrode L3 are floated and the second individual electrode L2 and the fourth individual electrode L4 maintain a constant potential difference (i.e., the driving voltage), more natural movement of the interface 130 may be implemented as described in FIG. 5D and damping which may occur due to a potential difference between individual electrodes may be reduced.

In the first to sixth modes ①, ②, ③, ④, ⑤, and ⑥, the driving voltage applied to the first individual electrode L1 and the common electrode C0 may be determined by ON/OFF of a plurality of switch elements included in the control circuit. When the ground voltage, the positive voltage, or the negative voltage is applied to the first individual electrode L1, the second individual electrode L2, and the common electrode C0, which path and which switch element are used are denoted by dotted lines and arrows as illustrated in FIG. 14.

Paths denoted by dotted lines and arrows in the circuit of FIG. 14 are purely exemplary and various combinations of different paths may be used to transmit the driving voltage to the first individual electrode L1, the second individual electrode L2, and the common electrode C0 according to an embodiment.

Figure 15:
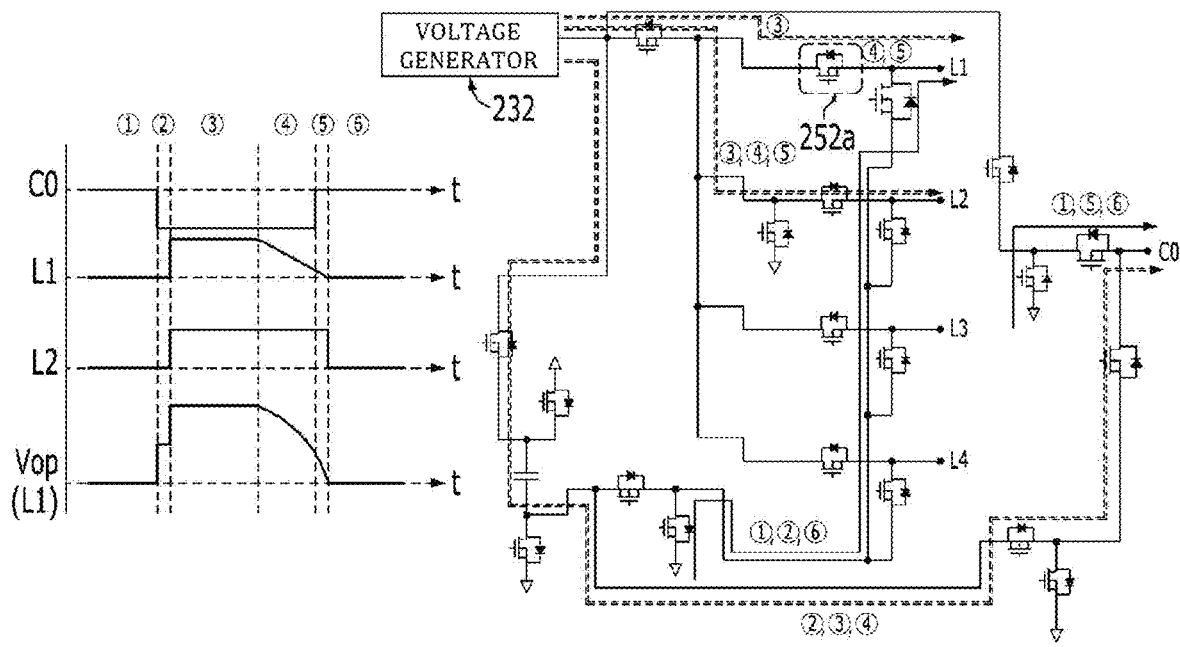
FIG. 15 illustrates a second operation example according to an embodiment of the control circuit illustrated in FIG. 13.

FIG. 15 is a diagram illustrating a second operation example according to an embodiment of the control circuit illustrated in FIG. 13.

The liquid lens 28 (refer to FIGS. 4A-4B and 10) includes four individual electrodes L1, L2, L3, and L4 and one common electrode C0 and it is assumed that the first individual electrode L1 and the third individual electrode L3 are symmetrically arranged based on the center of the liquid lens 28 and the second individual electrode L2 and the fourth individual electrode L4 are symmetrically arranged based on the center of the liquid lens 28. Hereinafter, for convenience of description, description will be given focusing on a driving voltage applied to the first individual electrode L1, the second individual electrode L2, and the common electrode C0. Particularly, the case in which a negative voltage is applied to the common electrode C0 in FIG. 15 is explained.

If the first individual electrode L1 and the third individual electrode L3 are symmetrically arranged based on the center of the liquid lens 28 and the second individual electrode L2 and the fourth individual electrode L4 are symmetrically arranged based on the center of the liquid lens 28, the same driving voltage may be applied to the first individual electrode L1 and the third individual electrode L3 and the same driving voltage may be applied to the second individual electrode L2 and the fourth individual electrode L4. According to an embodiment, different driving voltages may be applied to the first individual electrode L1, the second individual electrode L2, the third individual electrode L3, and the fourth individual electrode L4. For example, driving voltages symmetrical to or different from driving voltages applied to the first and second individual electrodes L1 and L2 may be applied at the same time t to the third and fourth individual electrodes L3 and L4. That is, at the same time t, a driving voltage having the same level as or a different level from a driving voltage applied to the first individual electrode L1 may be applied to the third individual electrode L3 and a driving voltage having the same level as or a different level from a driving voltage applied to the second individual electrode L2 may be applied to the fourth individual electrode L4.

Referring to the timing chart illustrated in FIG. 15, a plurality of operating modes ①, ②, ③, ④, ⑤, and ⑥ may be present according to timings at which the driving voltage is applied to the first individual electrode L1, the second individual electrode L2, and the common electrode C0. In the first mode ①, a ground voltage is applied to all of the common electrode C0, the second individual electrode L2, and the first individual electrode L1. In the second mode ②, a negative voltage transmitted by the charge pump which converts a positive voltage generated by the voltage generator 232 into the negative voltage is applied to the common electrode C0 and the ground voltage is applied to the first individual electrode L1 and the second individual electrode L2. In the third mode ③, the negative voltage transmitted by the charge pump is applied to the common electrode C0 and the positive voltage generated by the voltage generator 232 is applied to the first individual electrode L1 and the second individual electrode L2. In the fourth mode ④, the first individual electrode L1 is floated and the second individual electrode L2 and the common electrode C0 are not floated. Then, in the fourth mode ④, the negative voltage is applied to the common electrode C0 and the positive voltage is applied to the second individual electrode L2, whereas the first individual electrode L1 is floated. Referring to the timing chart, although, in the fourth mode ④, the level of a voltage applied to the floated first individual electrode L1 gradually lowered, the voltage of the floated first individual electrode L1 may have a level which is difficult to predict. Accordingly, a potential difference between the second individual electrode L2 and the common electrode C0, which are not floated, may be clear. Meanwhile, although it is difficult to clearly explain the potential difference between the first individual electrode L1 and the common electrode C0, movement of charges may be naturally performed in a floated state as compared with artificial control of movement of charges. If movement of charges is naturally performed, the potential difference between the first individual electrode L1 and the common electrode C0 may be gradually reduced as illustrated in the timing chart. In the fifth mode ⑤, the ground voltage is applied to the common electrode C0 and the first individual electrode L1 is floated, whereas the positive voltage generated by the voltage generator 232 is applied to the second individual electrode L2. In the sixth mode ⑥, the ground voltage is applied to all of the common electrode C0, the first individual electrode L1, and the second individual electrode L2.

In the first to sixth modes ①, ②, ③, ④, ⑤, and ⑥, movement of an interface 130 included in the liquid lens 28 may be determined by the magnitude of a driving voltage Vop applied between the common electrode C0 and the first individual electrode L1 or between the common electrode C0 and the second individual electrode L2. In this case, movement of the interface 130 may be controlled by an absolute value of the magnitude of the driving voltage Vop regardless of the polarity of the driving voltage Vop. For example, if the first individual electrode L1 and the third individual electrode L3 are floated and the second individual electrode L2 and the fourth individual electrode L4 maintain a constant potential difference (i.e., the driving voltage), more natural movement of the interface 130 may be implemented as described in FIGS. 5A-5D and damping which may occur due to a potential difference between individual electrodes may be reduced.

In the first to sixth modes ①, ②, ③, ④, ⑤, and ⑥, the driving voltages applied to the first individual electrode L1 and the common electrode C0 may be determined by ON/OFF of a plurality of switch elements included in the control circuit. When the ground voltage, the positive voltage, or the negative voltage is applied to the first individual electrode L1, the second individual electrode L2, and the common electrode C0, which path and which switch element are used are denoted by dotted lines and arrows as illustrated in FIG. 15.

Referring to FIGS. 14 and 15, a driving voltage having a magnitude which is twice the magnitude of a voltage applied to an electrode may be applied to the liquid lens by applying voltages having opposite polarities to the first individual electrode L1 and the common electrode C0 or applying voltages having opposite polarities to the second individual electrode L2 and the common electrode C0. For example, when a driving voltage of about 70 V is needed to control movement of the interface included in the liquid lens, if voltages of about 35 V having different polarities are applied to the first individual electrode L1 and the common electrode C0, substantially the same effect as applying a driving voltage of about 70 V may be obtained. A switching element for selectively transmitting a lower voltage may be reduced in size. Then, the control circuit may be miniaturized and integration thereof may be raised.

Figure 16:
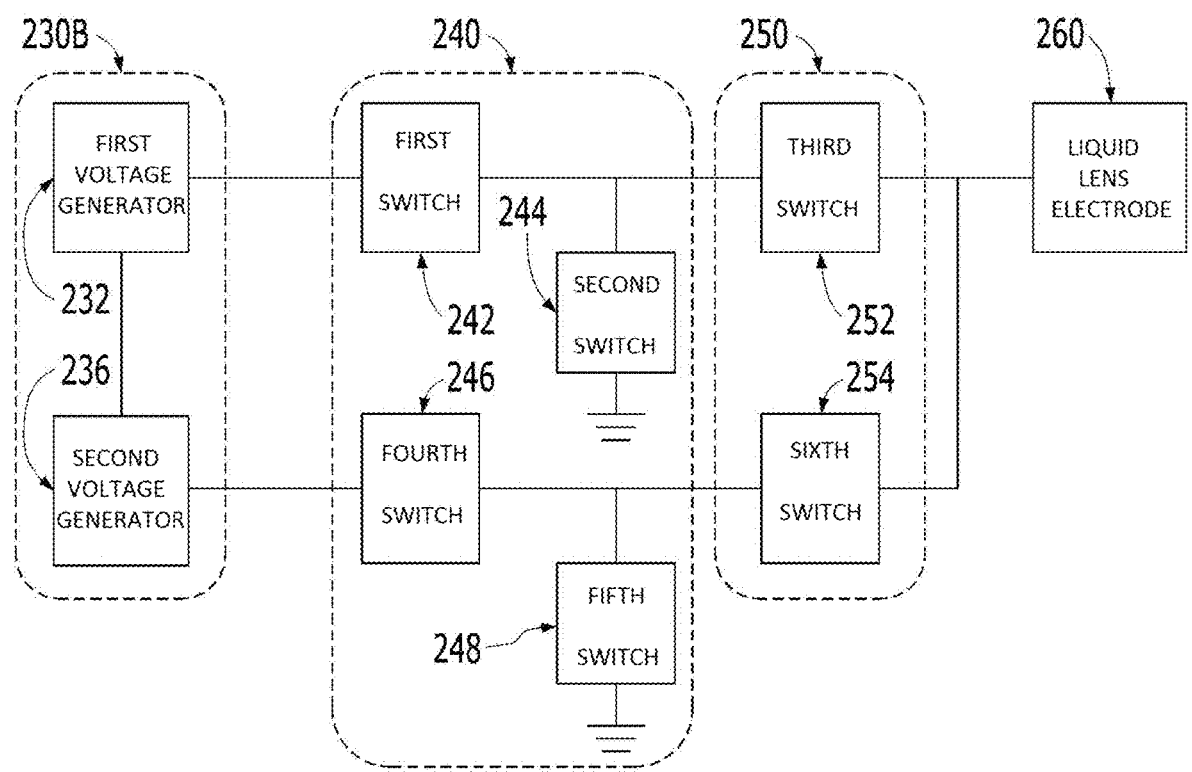
FIG. 16 illustrates a sixth embodiment of a control circuit.

FIG. 16 is a diagram illustrating a sixth embodiment of the control circuit.

The control circuit illustrated in FIG. 16 may include a driving voltage output unit 230B for outputting a plurality of voltages of a preset magnitude having a polarity (positive polarity or negative polarity), a first switching unit 240 for selectively transmitting one of a voltage transmitted by the driving voltage output unit 230B and a ground voltage, and a second switching unit 250 for selectively transmitting a driving voltage transmitted by the first switching unit 240 to a liquid lens electrode 260. The liquid lens electrode 260 may be one of the plural electrodes 132 and 134 included in the liquid lens 28 (refer to FIG. 10).

The driving voltage output unit 230B may include a first voltage generator 232 for generating a first voltage of a preset increased size based on a power voltage or a supply voltage and a second voltage generator 236 for generating a second voltage having a preset increased size based on the power voltage of the supply voltage and generating the second voltage having an opposite polarity to the first voltage. As compared with the control circuit described in FIG. 8, the driving voltage output unit 230B may include the second voltage generator 236 capable of individually generating the second voltage instead of using the charge pump 234.

The first switching unit 240 may include a first switch 242 for selectively transmitting the first voltage transmitted by the first voltage generator 232 and a second switch 244 for selectively transmitting a first ground voltage. The first switching unit 240 may further include a fourth switch 246 for selectively transmitting a second voltage transmitted by the charge pump 234 and a fifth switch 248 for selectively transmitting a second ground voltage.

The first switching unit 240 may include two different input terminals and two different output terminals. The first ground voltage and the second ground voltage may be electrically connected.

The second switching unit 250 may include a third switch 252 for selectively transmitting one of the received first voltage and first ground voltage to the liquid lens electrode 260 and a sixth switch 254 for selectively transmitting one of the received second voltage and second ground voltage to the liquid lens electrode 260.

The first switching unit 240 may be commonly disposed in electrodes included in the liquid lens 28. For example, the first switching unit 240 may be shared between a plurality of individual electrodes included in the liquid lens so that a driving voltage may be transmitted to the plural individual electrodes through at least one first switching unit 240.

On the other hand, the second switching unit 250 needs to be individually disposed in each electrode included in the liquid lens 28. For example, the second switching unit 250 may be independently connected to each of the plural individual electrodes included in the liquid lens 28, so that the second switching unit 250 may not be shared between the liquid lens electrodes 260.

Figure 17:
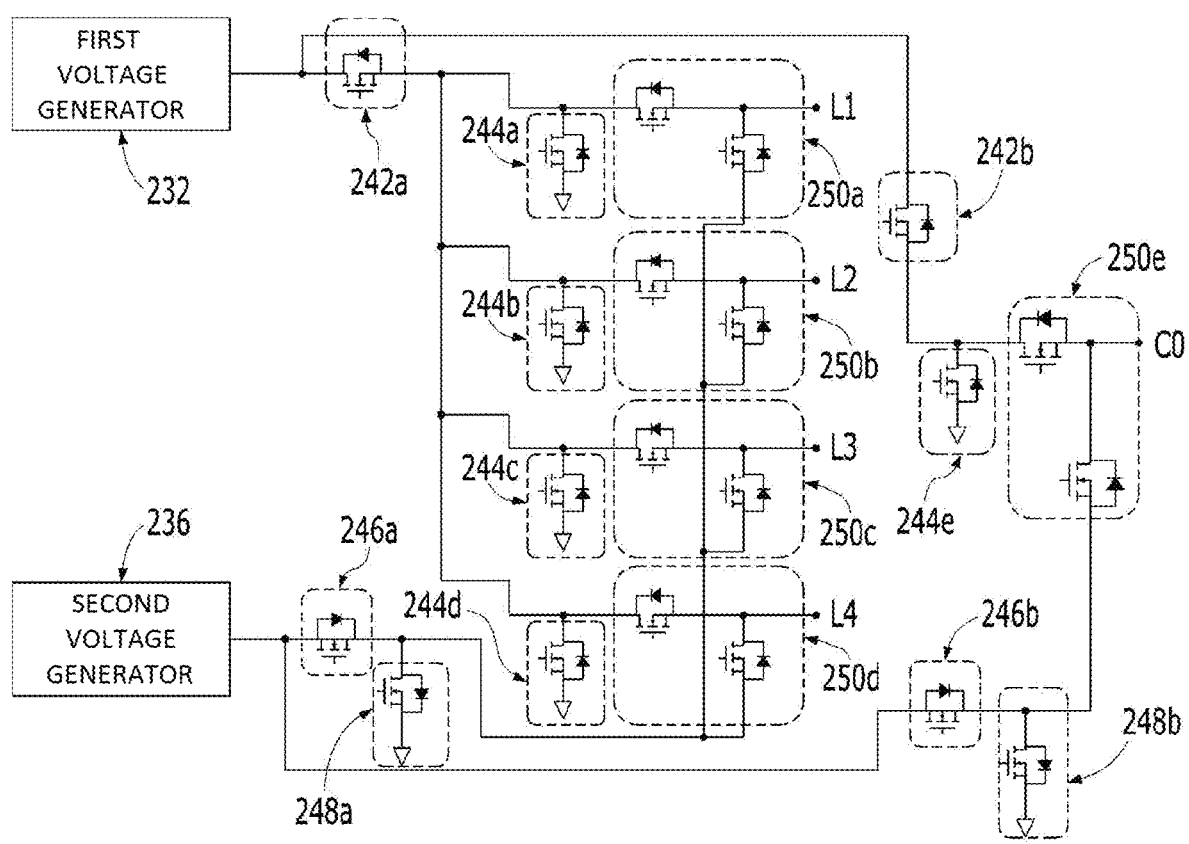
FIG. 17 illustrates a seventh embodiment of a control circuit.

FIG. 17 illustrates a seventh embodiment of the control circuit.

The control circuit illustrated in FIG. 17 may include a first voltage generator 232 for generating a voltage having a preset polarity and magnitude, a second voltage generator 236 for generating a voltage having an opposite polarity to the voltage generated from the first voltage generator 232 independently of the first voltage generator 232, a plurality of switching elements 242a, 242b, 244a, 244b, 244c, 244d, 244e, 246a, 246b, 248a, and 248b for transmitting a driving voltage to a plurality of electrodes L1, L2, L3, L4, and C0 included in a liquid lens, and a plurality of second switching units 250a, 250b, 250c, 250d, and 250e for selectively transmitting voltages transmitted by the plural switching elements 242a, 242b, 244a, 244b, 244c, 244d, 244e, 246a, 246b, 248a, and 248b to the plural electrodes L1, L2, L3, L4, and C0 included in the liquid lens. Herein the plural switching elements 242a, 242b, 244a, 244b, 244c, 244d, 244e, 246a, 246b, 248a, and 248b may correspond to the first switching unit 240 described with reference to FIG. 16.

According to the control circuit described in FIG. 17, 6 switching elements may be connected to the liquid lens electrode 260. However, in the control circuit described in FIG. 14, partial switch elements disposed in the individual electrodes L1, L2, L3, and L4 among the plural electrodes L1, L2, L3, L4, and C0 included in the liquid lens are commonly connected, thereby reducing the number of switch elements. For example, when the liquid lens includes four individual electrodes and one common electrode, the control circuit described in FIG. 16 may include a total of 30 (=5×6) switching elements, whereas the control circuit described in FIG. 17 may include a total of 21 switching elements.

Figure 18:
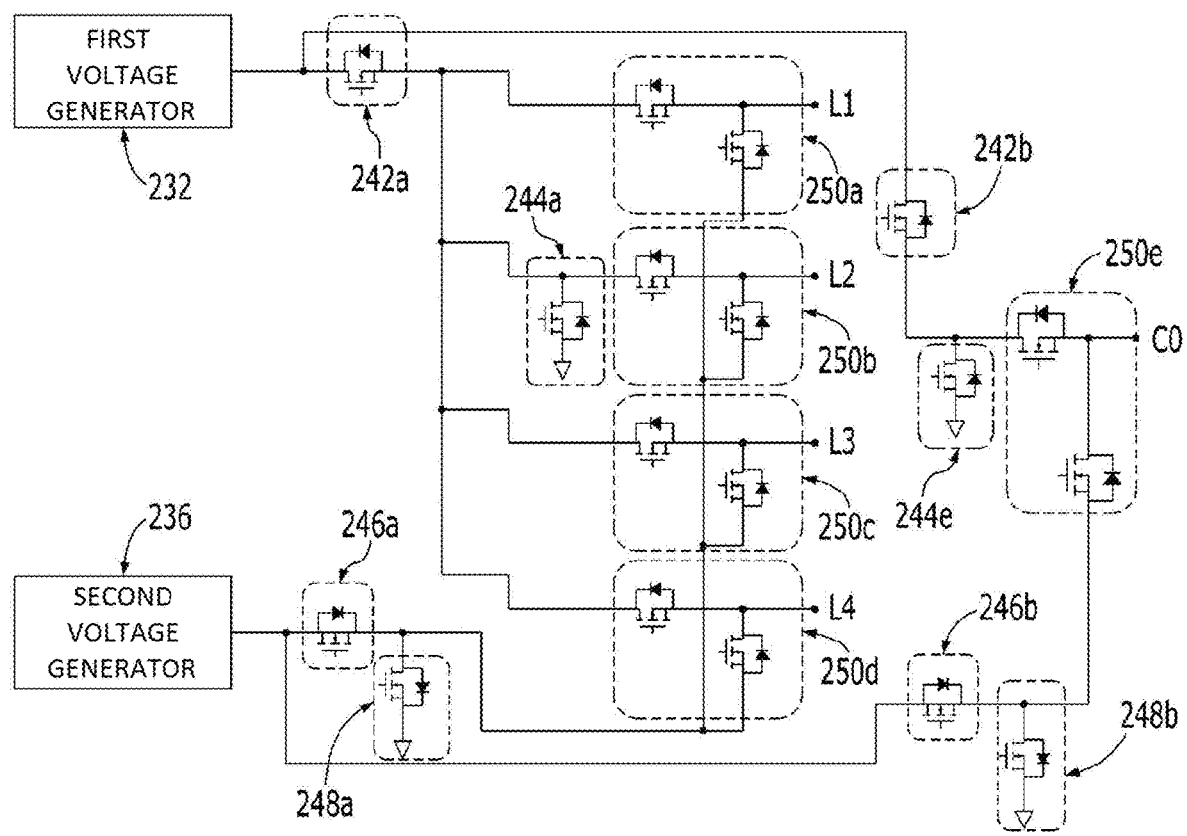
FIG. 18 illustrates an eighth embodiment of a control circuit.

FIG. 18 illustrates an eighth embodiment of the control circuit.

The control circuit illustrated in FIG. 18 may include a first voltage generator 232 for generating a voltage having a preset polarity and magnitude, a second voltage generator 236 for generating a voltage having an opposite polarity to the voltage generated from the first voltage generator 232 independently of the first voltage generator 232, a plurality of switching elements 242a, 242b, 244a, 244b, 246a, 246b, 248a, and 248b for transmitting a driving voltage to a plurality of electrodes L1, L2, L3, L4, and C0 included in a liquid lens, and a plurality of second switching units 250a, 250b, 250c, 250d, 250e for selectively transmitting voltages transmitted by the plural switching elements 242a, 242b, 244a, 244b, 246a, 246b, 248a, and 248b to the plural electrodes L1, L2, L3, L4, and C0 included in the liquid lens. Herein, the plural switching elements 242a, 242b, 244a, 244b, 246a, 246b, 248a, and 248b may correspond to the first switching unit 240 described with reference to FIG. 16.

When the liquid lens includes four individual electrodes and one common electrode, the control circuit described in FIG. 12 includes 21 switching elements, whereas the control circuit described in FIG. 18 may include 18 switching elements. Switching elements for selectively transmitting a ground voltage to each individual electrode included in the liquid lens may be connected commonly without being individually disposed, so that the number of switching elements included in the control circuit may further be reduced as illustrated in FIG. 18. If the number of switching elements is reduced, the total size of the control circuit may be reduced and power consumption may be decreased.

Referring to FIG. 18, the number of the plural switching elements 242a, 242b, 244a, 244b, 246a, 246b, 248a, and 248b corresponding to the first switching unit 240 described in FIG. 16 may be fixed regardless of the number of electrodes included in the liquid lens. For example, irrespective of whether 4, 8, 12, or 16 individual electrodes are included in the liquid lens, the first switching unit 240 described in FIG. 16 may be implemented only by 8 switching elements. On the other hand, the number of switching elements included in the plural second switching units 250a, 250b, 250c, 250d, and 250e may correspond to the number of electrodes included in the liquid lens, i.e., the sum of the number of individual electrodes and the number of common electrodes. In other words, the number of switching elements included in the plural second switching units 250a, 250b, 250c, 250d, and 250e may be twice the sum of the number of individual electrodes and the number of common electrodes included in the liquid lens. For example, if there are four individual electrodes and one common electrode included in the liquid lens, the number of electrodes is 5 and the number of switching elements included in the plural second switching units may be 10.

If the number of individual electrodes included in the liquid lens is 8 and the number of common electrodes included in the liquid lens is 1, the number of electrodes is 9 and the number of switching elements included in the plural second switching units may be 18. According to an embodiment, even when the number of electrodes included in the liquid lens varies, the number of switching elements included in the driving voltage control circuit may be fixed.

Figure 19:
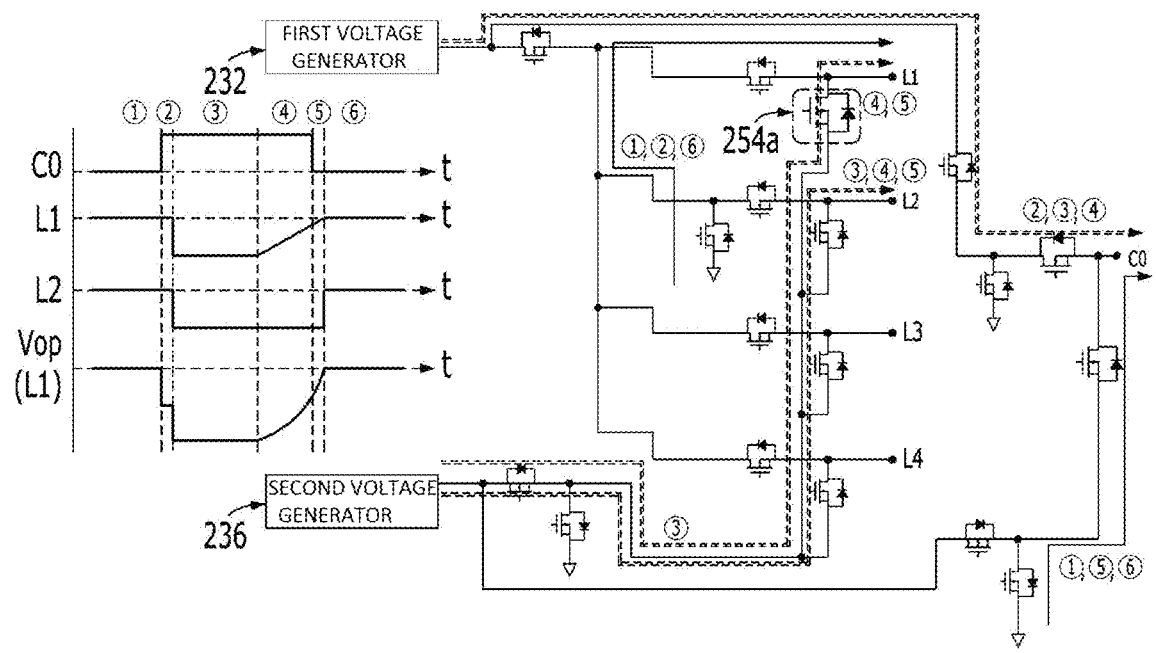
FIG. 19 illustrates a first operation example according to an embodiment of the control circuit illustrated in FIG. 18.

FIG. 19 illustrates a first operation example according to an embodiment of the control circuit illustrated in FIG. 18. The liquid lens 28 (refer to FIGS. 4A-4B and 10) includes four individual electrodes L1, L2, L3, and L4 and one common electrode C0 and it is assumed that the first individual electrode L1 and the third individual electrode L3 are symmetrically arranged based on the center of the liquid lens 28 and the second individual electrode L2 and the fourth individual electrode L4 are symmetrically arranged based on the center of the liquid lens 28. Hereinafter, for convenience of description, description will be given focusing on driving voltages applied to the first individual electrode L1, the second individual electrode L2, and the common electrode C0. Particularly, the case in which a positive voltage is applied to the common electrode C0 in FIG. 19 is explained.

If the first individual electrode L1 and the third individual electrode L3 are symmetrically arranged based on the center of the liquid lens 28 and the second individual electrode L2 and the fourth individual electrode L4 are symmetrically arranged based on the center of the liquid lens 28, the same driving voltages may be applied to the first individual electrode L1 and the third individual electrode L3 and the same driving voltages may be applied to the second individual electrode L2 and the fourth individual electrode L4. According to an embodiment, different driving voltages may be applied to the first individual electrode L1, the second individual electrode L2, the third individual electrode L3, and the fourth individual electrode L4. For example, driving voltages symmetrical to or different from driving voltages applied to the first and second individual electrodes L1 and L2 may be applied at the same time t to the third and fourth individual electrodes L3 and L4. That is, at the same time t, a driving voltage having the same level as or a different level from a driving voltage applied to the first individual electrode L1 may be applied to the third individual electrode L3 and a driving voltage having the same level as or a different level from a driving voltage applied to the second individual electrode L2 may be applied to the fourth individual electrode L4.

Referring to the timing chart illustrated in FIG. 19, a plurality of operating modes ①, ②, ③, ④, ⑤, and ⑥ may be present according to timings at which the driving voltage is applied to the first individual electrode L1, the second individual electrode L2, and the common electrode C0. In the first mode ①, a ground voltage is applied to all of the common electrode C0, the second individual electrode L2, and the first individual electrode L1. In the second mode ②, a positive voltage generated by the first voltage generator 232 is applied to the common electrode C0 and the ground voltage is applied to each of the first individual electrode L1 and the second individual electrode L2. In the third mode ③, the positive voltage generated by the first voltage generator 232 is applied to the common electrode C0 and a negative voltage transmitted by the second voltage generator 236 is applied to each of the first individual electrode L1 and the second individual electrode L2. In the fourth mode ④, the first individual electrode L1 is floated and the second individual electrode L2 and the common electrode C0 are not floated. That is, in the fourth mode ④, the positive voltage is applied to the common electrode C0 and the negative voltage is applied to the second individual electrode L2, whereas the first individual electrode L1 is floated.

Referring to the timing chart illustrated in FIG. 19, although, in the fourth mode ④, an absolute value of the level of the voltage applied to the floated first individual electrode L1 is gradually lowered, the voltage of the floated first individual electrode L1 may have a level which is difficult to predict. Accordingly, a potential difference between the second individual electrode L2 and the common electrode C0, which are not floated, may be clear. Meanwhile, although it is difficult to clearly explain a potential difference between the first individual electrode L1 and the common electrode C0, movement of charges may be naturally performed in a floated state as compared with artificial control of movement of charges. If movement of charges is naturally performed, the potential difference between the first individual electrode L1 and the common electrode C0 may be gradually reduced as illustrated in the timing chart. In the fifth mode ⑤, the ground voltage is applied to the common electrode C0 and the first individual electrode L1 is floated, whereas the negative voltage transmitted by the second voltage generator 236 is applied to the second individual electrode L2. In the sixth mode ⑥, the ground voltage is applied to all of the common electrode C0, the first individual electrode L1, and the second individual electrode L2.

In the first to sixth modes ①, ②, ③, ④, ⑤, and ⑥, movement of an interface 130 included in the liquid lens 28 may be determined by the magnitude of a driving voltage Vop applied between the common electrode C0 and the first individual electrode L1 or between the common electrode C0 and the second individual electrode L2. In this case, movement of the interface 130 may be controlled by an absolute value of the magnitude of the driving voltage Vop regardless of the polarity of the driving voltage Vop. For example, if the first individual electrode L1 and the third individual electrode L3 are floated and the second individual electrode L2 and the fourth individual electrode L4 maintain a constant potential difference (i.e., the driving voltage), more natural movement of the interface 130 may be implemented as described in FIG. 5D and damping which may occur due to a potential difference between individual electrodes may be reduced.

In the first to sixth modes ①, ②, ③, ④, ⑤, and ⑥, the driving voltage applied to the first individual electrode L1 and the common electrode C0 may be determined by ON/OFF of a plurality of switch elements included in the control circuit. When the ground voltage, the positive voltage, or the negative voltage is applied to the first individual electrode L1, the second individual electrode L2, and the common electrode C0, which path and which switch element are used are denoted by dotted lines and arrows as illustrated in FIG. 19.

Paths denoted by dotted lines and arrows in the circuit of FIG. 19 are purely exemplary and various combinations of different paths may be used to transmit the driving voltage to the first individual electrode L1 and the common electrode C0 according to an embodiment.

Figure 20:
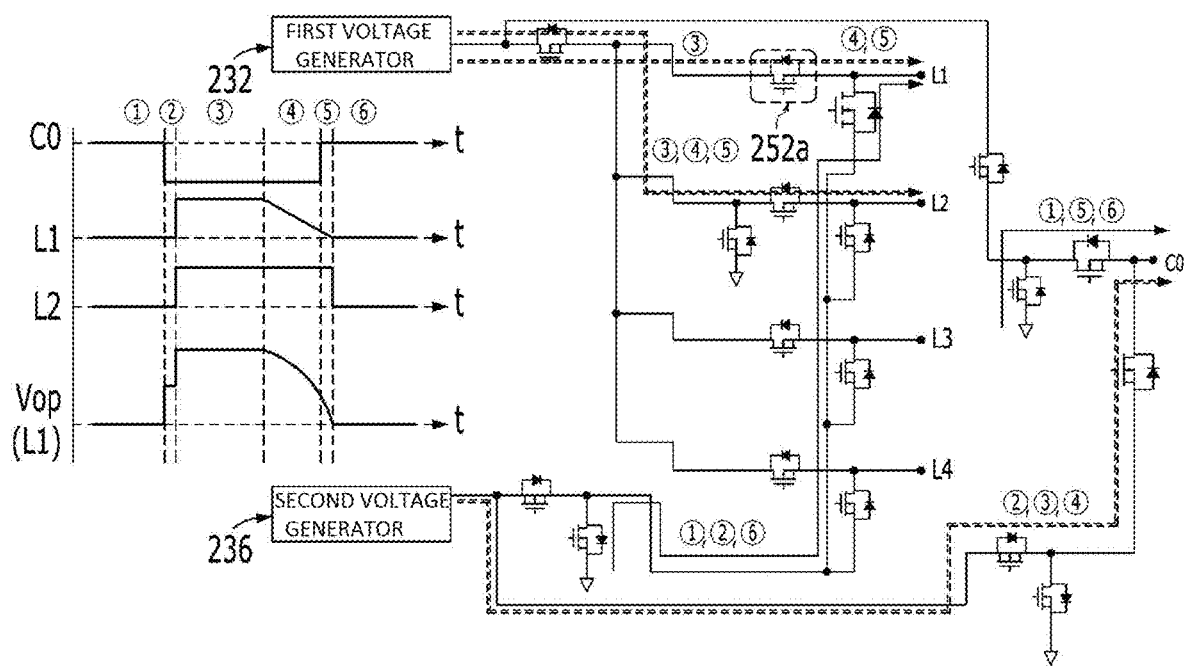
FIG. 20 illustrates a second operation example according to an embodiment of the control circuit illustrated in FIG. 18.

FIG. 20 illustrates a second operation example according to an embodiment of the control circuit illustrated in FIG. 18.

The liquid lens 28 (refer to FIGS. 4A-4B and 10) includes four individual electrodes L1, L2, L3, and L4 and one common electrode C0 and it is assumed that the first individual electrode L1 and the third individual electrode L3 are symmetrically arranged based on the center of the liquid lens 28 and the second individual electrode L2 and the fourth individual electrode L4 are symmetrically arranged based on the center of the liquid lens 28. Hereinafter, for convenience of description, description will be given focusing on a driving voltage applied to the first individual electrode L1, the second individual electrode L2, and the common electrode C0. Particularly, the case in which a negative voltage is applied to the common electrode C0 in FIG. 20 is explained.

If the first individual electrode L1 and the third individual electrode L3 are symmetrically arranged based on the center of the liquid lens 28 and the second individual electrode L2 and the fourth individual electrode L4 are symmetrically arranged based on the center of the liquid lens 28, the same driving voltage may be applied to the first individual electrode L1 and the third individual electrode L3 and the same driving voltage may be applied to the second individual electrode L2 and the fourth individual electrode L4. According to an embodiment, different driving voltages may be applied to the first individual electrode L1, the second individual electrode L2, the third individual electrode L3, and the fourth individual electrode L4. For example, a driving voltage symmetrical to or different from a driving voltage applied to the first and second individual electrodes L1 and L2 may be applied at the same time t to the third and fourth individual electrodes L3 and L4. That is, at the same time t, a driving voltage having the same level as or a different level from a driving voltage applied to the first individual electrode L1 may be applied to the third individual electrode L3 and a driving voltage having the same level as or a different level from a driving voltage applied to the second individual electrode L2 may be applied to the fourth individual electrode L4.

Referring to the timing chart illustrated in FIG. 20, a plurality of operating modes ①, ②, ③, ④, ⑤, and ⑥ may be present according to timings at which the driving voltage is applied to the first individual electrode L1, the second individual electrode L2, and the common electrode C0. In the first mode ①, a ground voltage is applied to all of the common electrode C0, the second individual electrode L2, and the first individual electrode L1. In the second mode ②, a negative voltage transmitted by the second voltage generator 236 is applied to the common electrode C0 and the ground voltage is applied to each of the first individual electrode L1 and the second individual electrode L2. In the third mode ③, the negative voltage generated by second voltage generator 236 is applied to the common electrode C0 and the positive voltage generated by the first voltage generator 232 is applied to each of the first individual electrode L1 and the second individual electrode L2. In the fourth mode ④, the first individual electrode L1 is floated and the second individual electrode L2 and the common electrode C0 are not floated. That is, in the fourth mode ④, the negative voltage is applied to the common electrode C0 and the positive voltage is applied to the second individual electrode L2, whereas the first individual electrode L1 is floated. Referring to the timing chart, although the level of a voltage applied to the floated first individual electrode L1 in the fourth mode ④ is gradually lowered, the voltage of the floated first individual electrode L1 may have a level which is difficult to predict. Accordingly, a potential difference between the second individual electrode L2 and the common electrode C0 which are not floated may be clear. Meanwhile, although it is difficult to clearly explain the potential difference between the first individual electrode L1 and the common electrode C0, movement of charges may be naturally performed in a floated state as compared with artificial control of movement of charges. If movement of charges is naturally performed, the potential difference between the first individual electrode L1 and the common electrode C0 may be gradually reduced as illustrated in the timing chart. In the fifth mode ⑤, the ground voltage is applied to the common electrode C0 and the first individual electrode L1 is floated, whereas the positive voltage generated by the voltage generator 232 is applied to the second individual electrode L2. In the sixth mode ⑥, the ground voltage is applied to all of the common electrode C0, the first individual electrode L1, and the second individual electrode L2.

In the first to sixth modes ①, ②, ③, ④, ⑤, and ⑥, movement of an interface 130 included in the liquid lens 28 may be determined by the magnitude of a driving voltage Vop applied between the common electrode C0 and the first individual electrode L1 or between the common electrode C0 and the second individual electrode L2. In this case, movement of the interface 130 may be controlled by an absolute value of the magnitude of the driving voltage Vop regardless of the polarity of the driving voltage Vop. For example, if the first individual electrode L1 and the third individual electrode L3 are floated and the second individual electrode L2 and the fourth individual electrode L4 maintain a constant potential difference (i.e., the driving voltage), more natural movement of the interface 130 may be implemented as described in FIGS. 5A-5D and damping which may occur due to a potential difference between individual electrodes may be reduced.

In the first to sixth modes ①, ②, ③, ④, ⑤, and ⑥, the driving voltage applied to the first individual electrode L1 and the common electrode C0 may be determined by ON/OFF of a plurality of switch elements included in the control circuit. When the ground voltage, the positive voltage, or the negative voltage is applied to the first individual electrode L1, the second individual electrode L2, and the common electrode C0, which path and which switch element are used are denoted by dotted lines and arrows as illustrated in FIG. 20.

Paths denoted by dotted lines and arrows in the circuit of FIG. 20 are purely exemplary and various combinations of different paths may be used to transmit the driving voltage to the first individual electrode L1 and the common electrode C0, according to the embodiment.

Referring to FIGS. 19 and 20, a driving voltage having a magnitude which is twice the magnitude of a voltage applied to an electrode may be applied to the liquid lens by applying voltages having opposite polarities to the first individual electrode L1 and the common electrode C0. Then, when a driving voltage of about 70 V is needed to control movement of the interface included in the liquid lens, if voltages of about 35 V having different polarities are applied to the first individual electrode L1 and the common electrode C0, substantially the same effect as applying a driving voltage of about 70 V may be obtained. A switching element for selectively transmitting a lower voltage may be reduced in size. Then, the control circuit may be miniaturized and integration thereof may be raised.

The above-described liquid lens may be included in a camera module. The camera module may include a lens assembly including a liquid lens mounted in a housing and at least one solid lens disposed in front of or behind the liquid lens, an image sensor for converting an optical signal transmitted through the lens assembly to an electrical signal, and a control circuit for supplying a driving voltage to the liquid lens.

A camera module according to an embodiment may include a liquid lens including a common electrode and a plurality of individual electrodes; and a control circuit connected electrically to the common electrode and the individual electrodes and configured to control the liquid lens, wherein, when a driving voltage for driving the liquid lens is changed, the control circuit floats at least one of the plural individual electrodes in a state in which a first voltage is applied to the common electrode.

The control circuit may apply a second voltage to the at least one individual electrode after floating the at least one individual electrode.

The control circuit may include a voltage generator configured to generate a voltage; a first switching unit configured to selectively switch the voltage generated from the voltage generator or a ground voltage; and a second switching unit configured to switch a voltage output from the first switching unit ON or OFF.

The voltage generator may include a first voltage generator; and a second voltage generator, wherein a voltage output from the first voltage generator is different from a voltage output from the second voltage generator.

The second switching unit may include a first switch configured to switch the voltage output from the first switching unit ON or OFF; and a second switch configured to switch the voltage output from the second voltage generator ON or OFF.

The floating may be a state in which the first switch and the second switch are simultaneously switched OFF.

The control circuit may float the individual electrode when driving voltages applied to at least two individual electrodes among the plural individual electrodes are different.

The first voltage and the second voltage may be the same voltage.

The driving voltage may be a root mean square voltage of a voltage applied between the common electrode and the individual electrodes.

A camera module according to an embodiment may include a liquid lens including a common electrode and a plurality of individual electrodes; and a control circuit connected electrically to the common electrode and the plural individual electrodes and configured to control the liquid lens, wherein the control circuit may include a voltage generator configured to generate a voltage; a first switching element disposed between the voltage generator and the individual electrodes; and a second switching unit disposed between the first switching unit and the individual electrodes, and wherein, when a driving voltage applied to the liquid lens is changed, the control circuit may switch the second switching unit OFF during a preset time.

The voltage generator may include a first voltage generator; and a second voltage generator, wherein a voltage output from the first voltage generator is different from a voltage output from the second voltage generator, and wherein the second switching unit may include a first switch disposed between the first switching unit and the individual electrodes; and a second switch disposed between the second voltage generator and the individual electrodes.

The switching of the second switching unit OFF during the preset time may be a state in which the first switch and the second switch are simultaneously switched OFF.

Change of the driving voltage may be made from a low driving voltage to a high driving voltage.

The plural individual electrodes may include first to fourth individual electrodes disposed sequentially in a circumferential direction, and when a driving voltage applied to the first individual electrode is different from a driving voltage applied to the third individual electrode, at least one of the plural individual electrodes may be floated.

A method of controlling a liquid lens including a common electrode and a plurality of individual electrodes according to an embodiment may include, when a driving voltage applied to the liquid lens is changed, floating at least one of the plural individual electrodes during a preset time in a state in which a voltage is applied to the common electrode; and reapplying a voltage to the at least one individual electrode after floating the at least one individual electrode.

The floating may include floating at least one of two individual electrodes when driving voltages applied to the two individual electrodes among the plural individual electrodes are different.

The voltage may be a first voltage, a second voltage, or a ground voltage.

The liquid lens may include a first plate in which a cavity for accommodating a conductive liquid and a nonconductive liquid are formed; the common electrode disposed on the first plate; the plural individual electrodes disposed under the first plate; a second plate disposed on the common electrode; and a third plate disposed under the first plate.

Although only several embodiments have been described above with regard to embodiments, various other embodiments are possible. The technical contents of the above-described embodiments may be combined in various forms unless they are incompatible and, thus, may be implemented in new embodiments.

An optical device (or optical instrument) including the above-described camera module may be implemented. The optical device may include a device capable of processing or analyzing an optical signal. Examples of the optical device may include a camera/video device, a telescope, a microscope, an interferometer, a photometer, a polarimeter, a spectrometer, a reflectometer, an autocollimator, a lensmeter, etc. and the embodiments of the present invention may be applied to an optical device including a liquid lens. The optical device may also be implemented by a portable device such as a smartphone, a notebook computer, or a tablet computer. Such an optical device may include a camera module, a display unit for outputting an image, and a body housing in which the camera module and the display unit are mounted. The optical device may further include a communication module which is mounted in the body housing and communicates with other devices and a memory unit for storing data. The method according to the above-described embodiments may be implemented as a computer-executable program that can be recorded in a computer-readable medium. Examples of the computer-readable medium include a read only memory (ROM), a random access memory (RAM), a compact disc (CD)-ROM, a magnetic tape, a floppy disk, and an optical data storage.

The computer-readable recording medium can be distributed over a computer system connected to a network so that computer-readable code is written thereto and executed therefrom in a decentralized manner. Functional programs, code, and code segments needed to realize the above-described method can be easily derived by programmers skilled in the art.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are within the scope of the invention.

MODE FOR INVENTION

Various embodiments have been described in the best mode for carrying out the invention.

INDUSTRIAL APPLICABILITY

The liquid lens, and the camera module and the optical device including the same according to embodiments may be used in a camera/video device, a telescope, a microscope, an interferometer, a photometer, a polarimeter, a spectrometer, a reflectometer, an autocollimator, a lensmeter, and a portable device such as a smartphone, a notebook computer, or a tablet computer.

The invention claimed is:

1. A camera module, comprising:
  a liquid lens including a common electrode and a plurality of individual electrodes; and
  a lens housing comprising the liquid lens disposed therein;
  a control circuit connected electrically to the common electrode and the plurality of individual electrodes and configured to control the liquid lens,
  wherein the lens housing comprises an insertion hole in a side surface thereof and configured to have the liquid lens inserted therethrough in a lateral direction perpendicular to an optical axis,
  wherein, when a driving voltage for driving the liquid lens is changed, the control circuit floats at least one of the individual electrodes of the plurality of individual electrodes in a state in which a first voltage is applied to the common electrode,
  wherein the control circuit comprises:
    a first voltage generator configured to generate a first voltage;
    a first switching unit configured to selectively switch the first voltage generated from the first voltage generator or a first ground voltage; and
    a second switching unit configured to switch a voltage output from the first switching unit ON or OFF, and
  wherein the first switching unit comprises a first switch configured to selectively transmit the first voltage generated from the first voltage generator, a second switch configured to selectively transmit the first ground voltage, a third switch configured to selectively transmit a second negative voltage generated by a charge pump, and a fourth switch configured to selectively transmit a second ground voltage.

2. The camera module of claim 1, wherein the control circuit applies a second voltage to the at least one individual electrode after floating the at least one individual electrode.

3. The camera module of claim 2, wherein the first voltage and the second voltage are the same voltage.

4. The camera module of claim 1, wherein the control circuit comprises:
  a second voltage generator configured to generate the second voltage,
  wherein the first voltage output from the first voltage generator is different from the second voltage output from the second voltage generator.

5. The camera module of claim 4, wherein the second switching unit comprises:
  a fifth switch configured to switch the voltage output from the first switching unit ON or OFF; and
  a sixth switch configured to switch the second voltage output from the second voltage generator ON or OFF.

6. The camera module of claim 5, wherein the control circuit floats the at least one individual electrode by simultaneously switching the fifth switch and the sixth switch OFF.

7. The camera module of claim 1, wherein the control circuit floats the at least one individual electrode when driving voltages applied to at least two individual electrodes among the plurality of individual electrodes are different.

8. The camera module of claim 1, wherein the driving voltage is a root mean square voltage of a voltage applied between the common electrode and the plurality of individual electrodes.

9. The camera module of claim 1, wherein change of the driving voltage is made from a low driving voltage to a high driving voltage.

10. The camera module of claim 1,
  wherein the plurality of individual electrodes includes first to fourth individual electrodes disposed sequentially in a circumferential direction, and
  when a driving voltage applied to the first individual electrode is different from a driving voltage applied to the third individual electrode, at least one of the individual electrodes of the plurality of individual electrodes is floated.

11. A camera module, comprising:
a liquid lens including a common electrode and a plurality of individual electrodes; and
a lens housing comprising the liquid lens disposed therein;
a control circuit connected electrically to the common electrode and the plurality of individual electrodes and configured to control the liquid lens,
wherein the lens housing comprises an insertion hole in a side surface thereof and configured to have the liquid lens inserted therethrough in a lateral direction perpendicular to an optical axis,
wherein the control circuit comprises:
a first voltage generator configured to generate a first voltage;
a first switching unit disposed between the first voltage generator and the plurality of individual electrodes; and
a second switching unit disposed between the first switching unit and the plurality of individual electrodes,
wherein the control circuit is configured to switch the second switching unit OFF during a preset time when a driving voltage applied to the liquid lens is changed to float at least one of the individual electrodes of the plurality of individual electrodes, and
wherein the first switching unit comprises a first switch configured to selectively transmit the first voltage generated from the first voltage generator, a second switch configured to selectively transmit a first ground voltage, a third switch configured to selectively transmit a second negative voltage generated by a charge pump, and a fourth switch configured to selectively transmit a second ground voltage.

12. The camera module of claim 11, wherein the control circuit comprises:
a second voltage generator,
wherein the first voltage output from the first voltage generator is different from the second voltage output from the second voltage generator, and
wherein the second switching unit comprises:
a fifth switch disposed between the first switching unit and the plurality of individual electrodes; and
a sixth switch disposed between the second voltage generator and the plurality of individual electrodes.

13. The camera module of claim 12, wherein the control circuit switches the second switching unit OFF during the preset time by simultaneously switching the fifth switch and the sixth switch OFF.

14. The camera module of claim 11, wherein change of the driving voltage is made from a low driving voltage to a high driving voltage.

15. The camera module of claim 11,
wherein the plurality of individual electrodes includes first to fourth individual electrodes disposed sequentially in a circumferential direction, and
when a driving voltage applied to the first individual electrode is different from a driving voltage applied to the third individual electrode, at least one of the individual electrodes of the plurality of individual electrodes is floated.

16. The camera module of claim 11, wherein the liquid lens comprises:
a first plate in which a cavity for accommodating a conductive liquid and a non-conductive liquid is formed;
the common electrode disposed on the first plate;
the plurality of individual electrodes disposed under the first plate;
a second plate disposed on the common electrode; and
a third plate disposed under the first plate.

17. A method of controlling a liquid lens including a common electrode and a plurality of individual electrodes, the method comprising:
when a driving voltage applied to the liquid lens is changed, floating at least one individual electrode of the plurality of individual electrodes during a preset time in a state in which a voltage is applied to the common electrode; and
reapplying a voltage to the at least one individual electrode after floating the at least one individual electrodes,
wherein the floating of the at least one individual electrode is performed by a control circuit in operable communication with the liquid lens, the control circuit comprising:
a voltage generator configured to generate a voltage;
a first switching unit configured to selectively switch the voltage generated from the voltage generator or a first ground voltage; and
a second switching unit configured to switch a voltage output from the first switching unit ON or OFF, and
wherein the first switching unit comprises a first switch configured to selectively transmit the voltage generated from the voltage generator, a second switch configured to selectively transmit the first ground voltage, a third switch configured to selectively transmit a negative voltage generated by a charge pump, and a fourth switch configured to selectively transmit a second ground voltage.

18. The method of claim 17, wherein the floating comprises floating at least one of two individual electrodes when driving voltages applied to the two individual electrodes among the plurality of individual electrodes are different.

* * * * *